United States Patent
Taghizadeh Motlagh et al.

(10) Patent No.: US 12,184,571 B2
(45) Date of Patent: Dec. 31, 2024

(54) SENSING REFERENCE SIGNAL CONFIGURATION

(71) Applicant: Lenovo (Singapore) Pte. Ltd., New Tech Park (SG)

(72) Inventors: Seyedomid Taghizadeh Motlagh, Oberursel (DE); Ali Ramadan Ali, Munich (DE); Ankit Bhamri, Rödermark (DE); Sher Ali Cheema, Ilmenau (DE); Razvan-Andrei Stoica, Essen (DE); Hyejung Jung, Northbrook, IL (US); Vijay Nangia, Woodridge, IL (US)

(73) Assignee: Lenovo (United States) Inc., Morrisville, NC (US)

( * ) Notice: Subject to any disclaimer, the term of this patent is extended or adjusted under 35 U.S.C. 154(b) by 482 days.

(21) Appl. No.: 17/538,998

(22) Filed: Nov. 30, 2021

(65) Prior Publication Data

US 2023/0171053 A1    Jun. 1, 2023

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04B 7/0617* (2013.01); *H04L 27/2613* (2013.01); *H04W 24/10* (2013.01)

(58) Field of Classification Search
CPC ..... H04L 47/10; H04L 43/50; H04L 12/2697; H04L 43/0852; H04L 43/00;
(Continued)

(56) References Cited

U.S. PATENT DOCUMENTS

2016/0212735 A1* 7/2016 Nogami ................ H04L 5/0048
2017/0230855 A1* 8/2017 Hu ........................ H04W 24/10
(Continued)

FOREIGN PATENT DOCUMENTS

| EP | 3 240 207 A1 * 11/2017 | ............... H04B 7/26 |
| WO | WO 2019/235906 A1 * 12/2019 | ............ H04L 27/261 |
| WO | WO 2022/187774 A1 * 9/2022 | .............. H04W 4/02 |

OTHER PUBLICATIONS

Kanhere, et al., "Target Localization using Bistatic and Multistatic Radar with 5G NR Waveform", 2021 IEEE 93rd Vehicular Technology Conference (VTC—Spring), Apr. 2021. (Year: 2021).*
(Continued)

*Primary Examiner* — Peter G Solinsky
*Assistant Examiner* — Sanjay K Dewan
(74) *Attorney, Agent, or Firm* — Kunzler Bean & Adamson

(57) ABSTRACT

Apparatuses, methods, and systems are disclosed for sensing reference signal configuration. One method includes receiving a first configuration from a second device. The method includes receiving a second configuration from the second device. The method includes, in response to receiving the second configuration: multiplexing the set of sensing reference signal patterns with other physical channels and signals; in response to being scheduled, transmitting the multiplexed set of sensing reference signal patterns; in response to being scheduled, receiving the multiplexed set of sensing reference signal patterns. The method includes receiving a third configuration from the second device. The third configuration indicates to perform measurements on received sensing reference signals and feedback a measurement report.

20 Claims, 10 Drawing Sheets

(51) Int. Cl.
   *H04B 7/06* (2006.01)
   *H04L 27/26* (2006.01)
   *H04W 24/10* (2009.01)
(58) Field of Classification Search
   CPC . H04L 5/0048; H04L 27/2613; H04B 7/0456; H04B 7/0617; H04W 24/10
   USPC .......................................................... 370/252
   See application file for complete search history.

(56) References Cited

U.S. PATENT DOCUMENTS

2021/0076367 A1* 3/2021 Bayesteh ................ H04W 4/70
2021/0385818 A1* 12/2021 Levitsky ............. H04W 72/569

OTHER PUBLICATIONS

3GPP TSG RAN WG1 Meeting #87, Reno, USA, Nov. 14-18, 2016, R1-1611296, Agenda Item: 7.1.4.4, Source: ZTE, Title: Discussion on grant-free transmission for URLLC. (Year: 2016).*
Fan Liu et al., Integrated Sensing and Communications: Towards Dual-functional Wireless Networks for 6G and Beyond, Aug. 16, 2021. (Year: 2021).*
Michael Hofstadler et al., Joint Communication and Sensing: 5G NR Compliant Ranging Using the Sounding Reference Signal, Sep. 15, 2022, (Year: 2022).*
PCT/IB2022/061615, "Notification of Transmittal of the International Search Report and the Written Opinion of the International Searching Authority, or the Declaration", International Searching Authority, Mar. 3, 2023, pp. 1-21.
Hofstadler et al., "Joint Communication and Sensing: 5G NR Compliant Ranging Using the Sounding Reference Signal", Journal of Latex Class Files, vol. 14, No. 8, arXiv:2209.06566v2 [eess.SP], Sep. 15, 2022, pp. 1-5.
Kanhere et al., "Target Localization using Bistatic and Multistatic Radar with 5G NR Waveform", IEEE 93rd Vehicular Technology Conference (VTC—Spring), arXiv:2103.03426v1 [cs.IT], Mar. 5, 2021, pp. 1-7.
Liu et al., "Integrated Sensing and Communications: Towards Dual-functional Wireless Networks for 6G and Beyond", arXiv:2108.07165v1 [eess.SP], Aug. 16, 2021, pp. 1-36.
Zte, "Discussion on grant-free transmission for URLLC", 3GPP TSG RAN WG1 Meeting #87 R1-1611296, Nov. 14-18, 2016, pp. 1-7.
M. Kiviranta et al., "5G Radar: Scenarios, Numerology and Simulations", 2019 International Conference on Military Communications and Information Systems (ICMCIS), May 1, 2019, Abstract p. 1.
P. Kumari et al., "IEEE 802.11 ad-Based Radar: An Approach to Joint Vehicular Communication-Radar System", IEEE Transactions on Vehicular Technology, Nov. 17, 2017, pp. 1-35.
J. Fink et al., "Comparison of OFDM Radar and Chirp Sequence Radar", IEEE, 2015 16th International Radar Symposium (IRS), Aug. 27, 2015, pp. 1-6.
Jan Mietzner, "DFT-Spread OFDM MIMO-Radar—An Alternative for Reduced Crest Factors", IEEE, 2019 20th International Radar Symposium (IRS), Jul. 22, 2019, Abstract pp. 1-2.
C. G. Barneto et al., "Full-Duplex OFDM Radar With LTE and 5G NR Waveforms: Challenges, Solutions, and Measurements", IEEE, IEEE Transactions on Microwave Theory and Techniques, Aug. 19, 2019, pp. 1-13.

* cited by examiner

SENSING REFERENCE SIGNAL CONFIGURATION

FIELD

The subject matter disclosed herein relates generally to wireless communications and more particularly relates to sensing reference signal configuration.

BACKGROUND

In certain wireless communications networks, sensing reference signals may be used. The sensing reference signals may be used in a variety of ways.

BRIEF SUMMARY

Methods for sensing reference signal configuration are disclosed. Apparatuses and systems also perform the functions of the methods. One embodiment of a method includes receiving, at a first device, a first configuration from a second device. The first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof. In certain embodiments, the method includes receiving a second configuration from the second device. The second configuration indicates one sensing reference signal pattern identifier, a group of sensing reference signal pattern identifiers, or a combination thereof from at least one sensing reference signal pattern identifier in the first configuration for multiplexing with physical channels and other reference signals. In some embodiments, the method includes, in response to receiving the second configuration: multiplexing the set of sensing reference signal patterns with other physical channels and signals; in response to being scheduled, transmitting the multiplexed set of sensing reference signal patterns; in response to being scheduled, receiving the multiplexed set of sensing reference signal patterns. In various embodiments, the method includes receiving a third configuration from the second device. The third configuration indicates to perform measurements on received sensing reference signals and feedback a measurement report.

One apparatus for sensing reference signal configuration includes a first device. In some embodiments, the apparatus includes a receiver that: receives a first configuration from a second device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; and receives a second configuration from the second device. The second configuration indicates one sensing reference signal pattern identifier, a group of sensing reference signal pattern identifiers, or a combination thereof from at least one sensing reference signal pattern identifier in the first configuration for multiplexing with physical channels and other reference signals. In various embodiments, the apparatus includes a processor and/or a transmitter. In certain embodiments, in response to receiving the second configuration: the processor multiplexes the set of sensing reference signal patterns with other physical channels and signals; the transmitter, in response to being scheduled, transmits the multiplexed set of sensing reference signal patterns; and the receiver, in response to being scheduled, receives the multiplexed set of sensing reference signal patterns; and the receiver receives a third configuration from the second device. The third configuration indicates to perform measurements on received sensing reference signals and feedback a measurement report.

Another embodiment of a method for sensing reference signal configuration includes transmitting, from a second device, a first configuration to a first device. The first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof. In some embodiments, the method includes transmitting a second configuration to the first device. The second configuration indicates one sensing reference signal pattern identifier, a group of sensing reference signal pattern identifiers, or a combination thereof from at least one sensing reference signal pattern identifier in the first configuration for multiplexing with physical channels and other reference signals. In certain embodiments, the method includes transmitting a third configuration to the first device. The third configuration indicates to perform measurements on received sensing reference signals and feedback a measurement report.

Another apparatus for sensing reference signal configuration includes a second device. In some embodiments, the apparatus includes a transmitter that: transmits a first configuration to a first device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; transmits a second configuration to the first device, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; and transmits a third configuration to the first device. The third configuration indicates to perform measurements on received sensing reference signals and feedback a measurement report.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
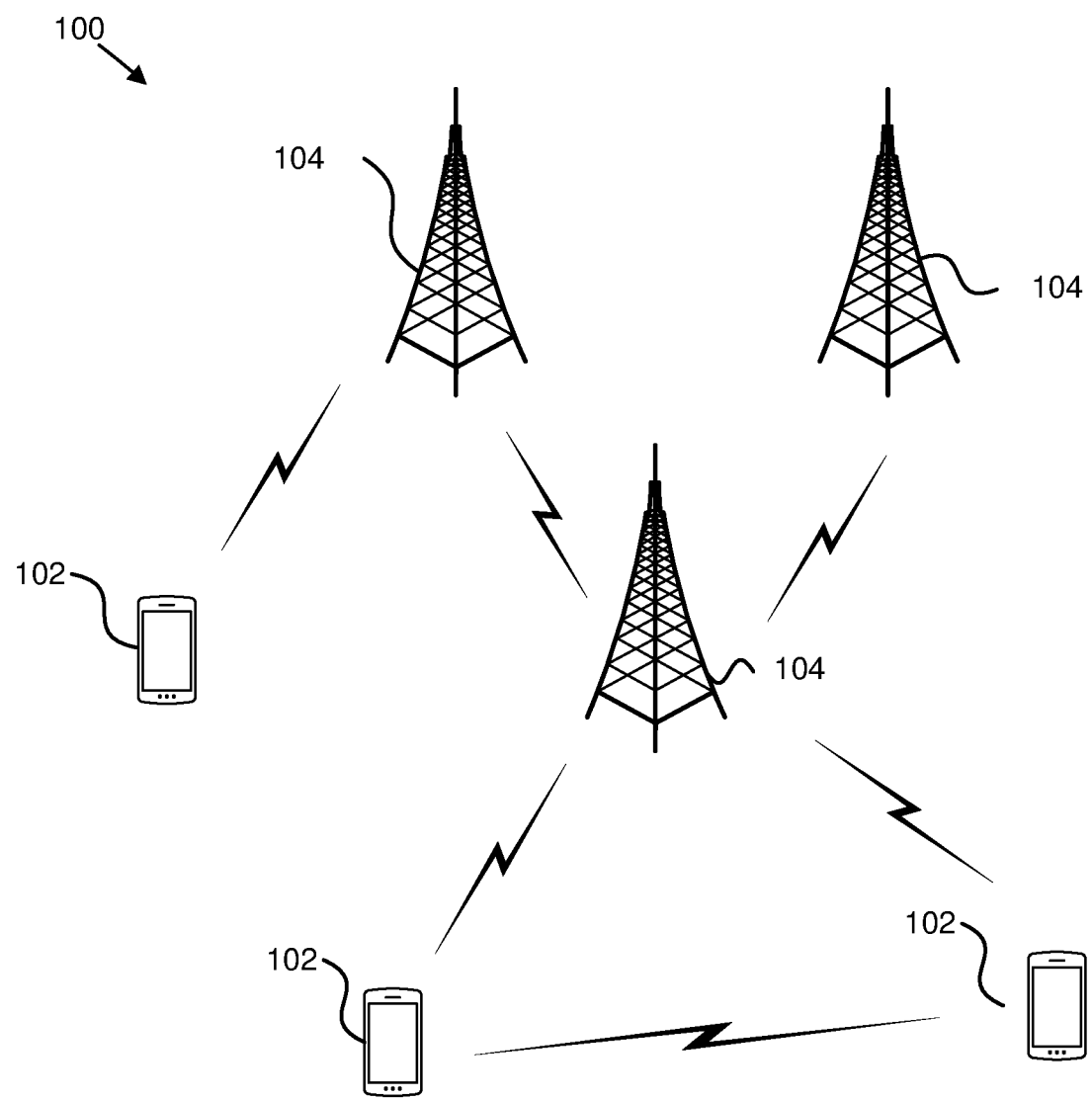
FIG. 1 is a schematic block diagram illustrating one embodiment of a wireless communication system for sensing reference signal configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for sensing reference signal configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive a first configuration from a second device. The first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof. In certain embodiments, the network unit 104 may receive a second configuration from the second device. The second configuration indicates one sensing reference signal pattern identifier, a group of sensing reference signal pattern identifiers, or a combination thereof from at least one sensing reference signal pattern identifier in the first configuration for multiplexing with physical channels and other reference signals. In some embodiments, the network unit 104 may, in response to receiving the second configuration: multiplex the set of sensing reference signal patterns with other physical channels and signals; in response to being scheduled, transmit the multiplexed set of sensing reference signal patterns; in response to being scheduled, receive the multiplexed set of sensing reference signal patterns. In various embodiments, the network unit 104 may receive a third configuration from the second device. The third configuration indicates to perform measurements on received sensing reference signals and feedback a measurement report. Accordingly, the network unit 104 may be used for sensing reference signal configuration.

In certain embodiments, a network unit 104 may transmit a first configuration to a first device. The first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof. In some embodiments, the network unit 104 may transmit a second configuration to the first device. The second configuration indicates one sensing reference signal pattern identifier, a group of sensing reference signal pattern identifiers, or a combination thereof from at least one sensing reference signal pattern identifier in the first configuration for multiplexing with physical channels and other reference signals. In certain embodiments, the network unit 104 may transmit a third configuration to the first device. The third configuration indicates to perform measurements on received sensing reference signals and feedback a measurement report. Accordingly, the network unit 104 may be used for sensing reference signal configuration.

Figure 2:
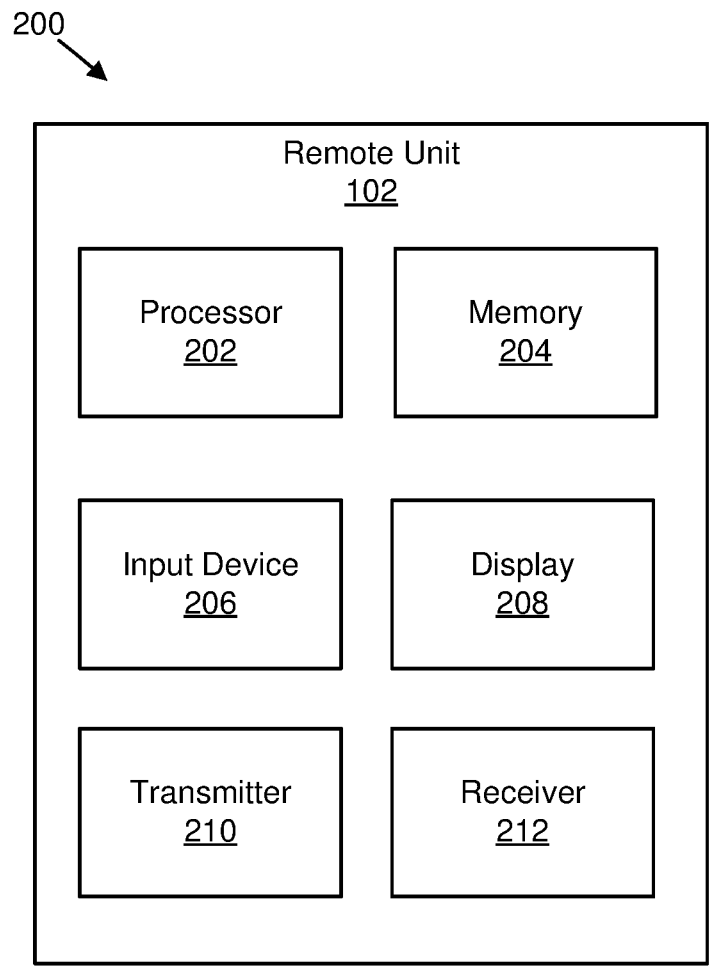
FIG. 2 is a schematic block diagram illustrating one embodiment of an apparatus that may be used for sensing reference signal configuration.

FIG. 2 depicts one embodiment of an apparatus 200 that may be used for sensing reference signal configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
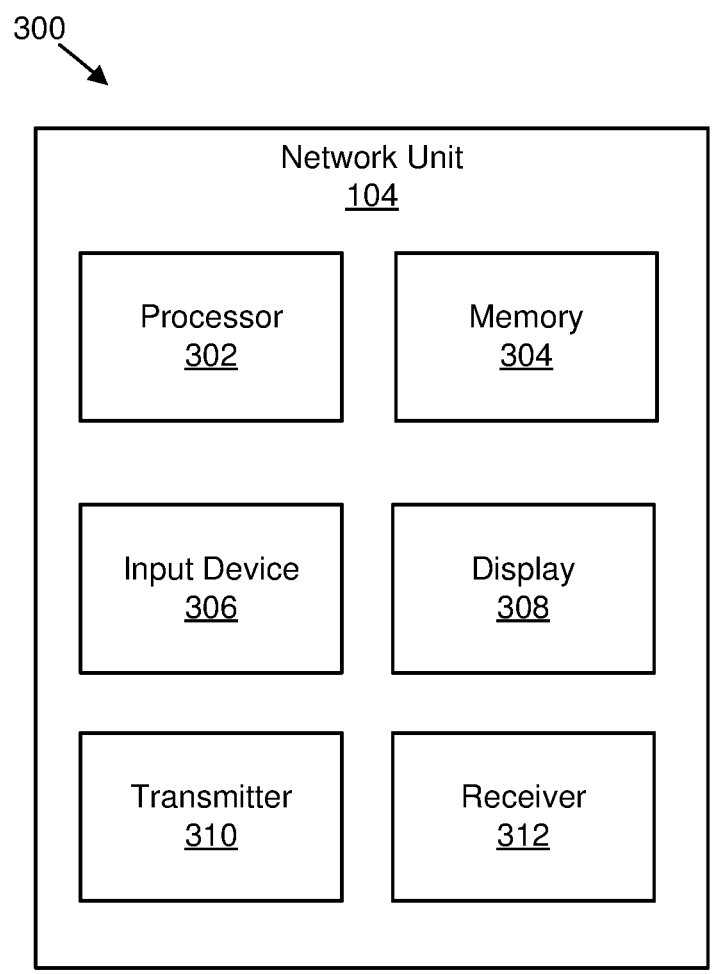
FIG. 3 is a schematic block diagram illustrating one embodiment of an apparatus that may be used for sensing reference signal configuration.

FIG. 3 depicts one embodiment of an apparatus 300 that may be used for sensing reference signal configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312: receives a first configuration from a second device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; and receives a second configuration from the second device. The second configuration indicates one sensing reference signal pattern identifier, a group of sensing reference signal pattern identifiers, or a combination thereof from at least one sensing reference signal pattern identifier in the first configuration for multiplexing with physical channels and other reference signals. In various embodiments, in response to receiving the second configuration: the processor 302 multiplexes the set of sensing reference signal patterns with other physical channels and signals; the transmitter 310, in response to being scheduled, transmits the multiplexed set of sensing reference signal patterns; and the receiver 312, in response to being scheduled, receives the multiplexed set of sensing reference signal patterns; and the receiver 312 receives a third configuration from the second device. The third configuration indicates to perform measurements on received sensing reference signals and feedback a measurement report.

In some embodiments, the transmitter 310: transmits a first configuration to a first device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; transmits a second configuration to the first device, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; and transmits a third configuration to the first device. The third configuration indicates to perform measurements on received sensing reference signals and feedback a measurement report.

In certain embodiments, radio sensing may be in cellular wireless networks as a mechanism to improve network performance and/or to enable serving vertical use configurations. In particular, radio sensing may obtain environment information by the means of: 1) transmission of a sensing excitation signal (e.g., sensing reference signal ("RS") from a network entity, via a "sensing TX node); 2) reception of reflections and/or echoes of the transmitted sensing excitation signal from an environment by a network entity (e.g., via a "sensing RX node); and/or 3) processing of received reflections and inferring relevant information from the environment. In some embodiments, to enable radio sensing capability within a communication network, a sensing RS may be defined and configured for sensing transmit ("TX") and sensing receive ("RX") nodes in accordance with requirements of a specific sensing task and/or the available network and/or user equipment ("UE") capabilities for sensing measurement and/or processing and the available resources that may be used for sensing, while allowing for the communicating network (e.g., communicating network function) to continue without degradation.

In various embodiments, there may be a flexible definition and/or configuration of sensing RSs in coexistence with other signal transmissions in which there may be: 1) multiplexing configurations of the sensing RSs with other sensing RS, other RS, and data channels and/or control channels; 2) multiplexing configurations of the sensing RSs with other RS or data channels and/or control channels in combination with a discrete Fourier transform ("DFT") spreading stage; and/or 3) signaling for sensing RS configuration and multiplexing.

In certain embodiments, there may be available reference signals within new radio ("NR") including demodulation reference signal ("DMRS"), phase tracking reference signal ("PTRS"), channel state information ("CSI") RS ("CSI-RS"), positioning reference signal ("PRS"), and/or sounding reference signal ("SRS") that may be used as sensing excitation for some of basic use configurations. In some embodiments, some available RS are combined and/or augmented with additional parameters to define a satisfying sensing RS. Since the available RS are not designed for the purpose of environment sensing, but mainly to extract communication-needed channel parameters, the application of the reference signals for some configurations may either lead to a reduced signaling and/or resource efficiency (e.g., if an RS needs to be augmented with several other parameters and/or configurations to achieve a specific requirement, or if the spent resources are unnecessarily high due to the limited available patterns), or the infeasibility of the sensing task (e.g., if the sensing signal does not support the needed waveform parameters—such as cyclic prefix ("CP") overhead).

In various embodiments, limitations of use of available reference signals may include: 1) limited time and/or frequency domain pattern flexibility (e.g., the time and/or frequency pattern is a decisive factor to satisfy the fundamental radar requirements (in terms of supported distance dynamic range and resolution, speed dynamic range and resolution, and/or radar processing gain) in an efficient manner. In most cases, the time-domain periodicity is usually fixed, or lacks the flexibility to define sensing RS efficiently, whereas the frequency domain patterns are usually limited. A relatively higher flexibility may be reached with CSI-RS (by enabling both time-periodicity as well as a proper frequency domain density over a large bandwidth). Nevertheless, this supports only single periodicity); 2) limited flexibility on numerology and/or waveform parameters (e.g., symbol dedicated to sensing may follow a different CP duration and/or waveform parameters. This is particularly needed if targeting a high-speed and/or high distance sensing scenario that requires especially large CP overhead and/or subcarrier spacing ("SCS"), or potentially another waveform); 3) limited multiplexing flexibility (e.g., some of the proposed multiplexing methods for sensing RS are beneficial for facilitating large sensing excitations (e.g., if sensing continues over multiple milliseconds, it is beneficial to use superimposed sensing RS at least during part of the sensing RS transmission). Current reference signals may not support this or support limited multiplexing options (e.g., including SRS, CSI-RS)); 3) limited radar-specific sequence adjustment and/or separation (e.g., the possibility of the sequence adjustments may not be supported in current reference signals); and/or 4) by defining a specific sensing RS, many of the other signaling requirements may be done implicitly (e.g., a specific sensing RS pattern also defines specific measurement criteria, requirements, and/or a type of multiplexing).

In certain embodiments found here, definition and/or configuration of sensing RSs in coexistence with other signal transmissions may include: 1) multiplexing of the sensing RSs with other sensing RS, other RS, and data channels and/or control channels for sensing RS transmission, sensing RS reception, sensing RS joint transmission and reception (e.g., parametric or a codebook-based multiplexing definitions for different usages of sensing RS via a time-domain multiplexing pattern, a frequency-domain multiplexing pattern, or a multiplexing method in a code domain); 2) multiplexing configurations of the sensing RS in combination with a DFT spreading stage (e.g., joint multiplexing and DFT spreading configuration by jointly defining a multiplexing pattern in time domain and/or frequency domain, and a DFT spreading location, DFT spreading dimension, and possible multiplexing types); and/or 3) signaling for sensing RS configuration and multiplexing.

It should be noted that embodiments described herein are not limited to the embodiments individually, and one or more elements from one or more embodiments may be combined. Moreover, it may be understood that the terms sensing RS and sensing RS-defining parameters may be interchangeably used. Further, the elements for sensing RS multiplexing may be applied to multiplexing of multiple sensing RS, multiplexing of a sensing RS or multiple sensing RSs with another RS (or multiple other RSs), multiplexing of a sensing RS or multiple sensing RSs with (one or multiple) data channel and/or control channel, or any combination thereof.

In a first embodiment there may be multiple sensing RS multiplexing. In such an embodiment, scheduling and/or configuration of multiple sensing tasks may be facilitated (e.g., sensing over different potential target locations by the same sensing TX (or the same sensing TX and RX pair), or sensing tasks involving different interfering sensing TX and RX pairs, the sensing RS may be multiplexed within the proper resource plane). In the first embodiment, multiple sensing RSs are multiplexed in time, frequency, beam, or code domain to facilitate multiple sensing operations.

In the first embodiment, there may be a parametric time and/or frequency multiplexing pattern.

In some embodiments, sensing RSs are multiplexed in a time domain or a frequency domain, where a similar parameterization or codebook-based pattern definition as defined within an element is employed to define the subsequent RS patterns in time, frequency, or joint in time and frequency. In various embodiments, some of the parameters and/or codebook elements for defining the sensing RS pattern is relatively defined or assumed to be fixed if defining for multiple RSs. In certain embodiments, if time-domain multiplexing is employed, the subsequent pattern-defining parameters include a sequence of distance-defining values $\Delta_{T,1} \ldots \Delta_{T,n}$, where $\Delta_{T,i}$ represents the time-domain distance of the "i"-th sensing RS to a subsequent one. In some embodiments, the values of $\Delta_T$ represent the displacement of a sensing RS with respect to a previous sensing RS, where the value of displacement is presented in the unit of one symbol, a step size equal to a number of symbols, or the complete RS duration (or a known sensing RS signal). In various embodiments, the value of $\Delta_T$ indicates a displacement of the starting RS symbol with respect to the starting RS symbol belonging to the previous sensing task. In certain embodiments, the value of $\Delta_T$ indicates a displacement of the starting RS symbol with respect to the last RS symbol or some symbol with a known relative position to the first or last symbol belonging to the previous sensing task. In some embodiments, the starting sensing RS symbol belonging to a sensing task may be the first symbol following the starting symbol (or symbol group with a known size) of a previous sensing task, the first symbol following the last symbol, or the first symbol following the symbol with a known relative position to the first symbol (or symbol group with a known size) of a previous sensing task that satisfies some conditions. The conditions may include a condition that a time-domain distance is beyond a known duration, or if a specific channel and/or transmission is not present.

Figure 4:
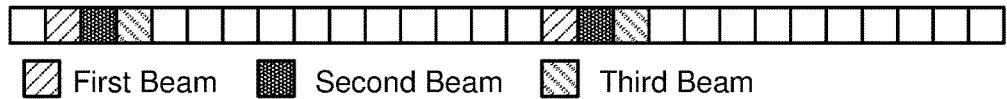
FIG. 4 is a schematic block diagram illustrating one embodiment of time domain multiplexing.
Figure 5:
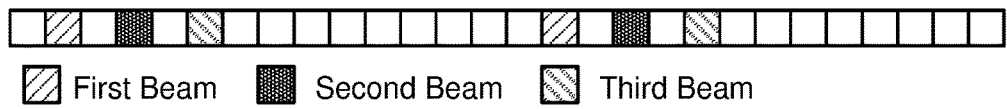
FIG. 5 is a schematic block diagram illustrating another embodiment of time domain multiplexing.
Figure 6:
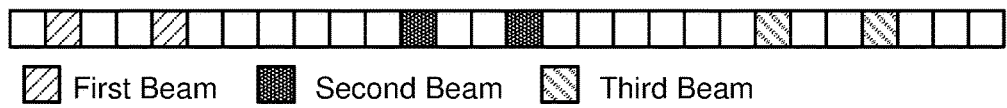
FIG. 6 is a schematic block diagram illustrating a further embodiment of time domain multiplexing.
Figure 7:
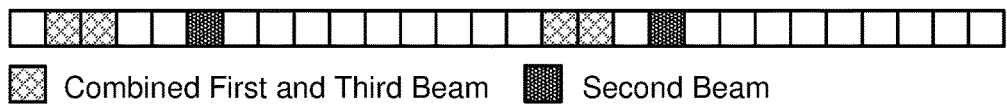
FIG. 7 is a schematic block diagram illustrating yet another embodiment of time domain multiplexing.
Figure 8:
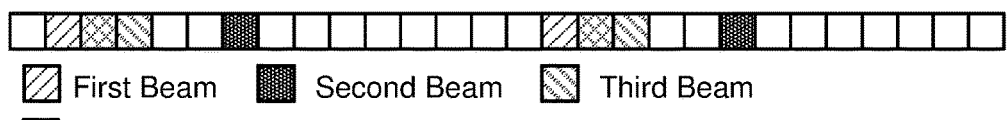
FIG. 8 is a schematic block diagram illustrating another embodiment of time domain multiplexing.

FIG. 4 is a schematic block diagram illustrating one embodiment of time domain multiplexing 400 along a time domain/symbol axis 402. FIG. 5 is a schematic block diagram illustrating another embodiment of time domain multiplexing 500. FIG. 6 is a schematic block diagram illustrating a further embodiment of time domain multiplexing 600. FIG. 7 is a schematic block diagram illustrating yet another embodiment of time domain multiplexing 700. FIG. 8 is a schematic block diagram illustrating another embodiment of time domain multiplexing 800.

FIGS. 4 through 8 illustrate time domain multiplexing of multiple sensing RS in a multi-beam sensing procedure (e.g., beam sweeping for sensing) along the time domain/symbol axis 402. Different shading patterns indicate sensing RS transmissions associated with different sensing tasks (e.g., different TX beams during beam sweeping, or the beams with different shading patterns may belong to different sensing TX nodes).

In FIGS. 4 through 8, the time domain multiplexing of multiple sensing RS in a multi-beam sensing procedure (e.g., beam sweeping for sensing) is depicted. In multiplexing the example pattern in FIG. 4, the symbol (or symbol group) associated with one sensing task starts immediately after the first symbol (or symbol group) associated with a previous sensing task. In the multiplexing example pattern in FIG. 5, the symbol (or symbol group) associated with one sensing task starts with a delay after the first symbol (or symbol group) associated with a previous sensing task. In the multiplexing example pattern in FIG. 6, the symbol (or symbol group) associated with one sensing task starts after the accomplishment of the previous sensing task with a known distance or when some known conditions are satisfied.

In some embodiments, exemplified by the patterns of FIGS. 7 and 8, some of the sensing tasks share the same time domain resource. In the multiplexing example pattern of FIG. 7, some of the sensing tasks share the same time domain resource. In the multiplexing example pattern of FIG. 8, at least a portion of some of the sensing tasks share the same time domain resource. In some embodiments, where multiple sensing tasks share the same time domain resource, the separation of the sensing RS is performed in a frequency domain. An example illustration of frequency domain multiplexing of multiple sensing RS transmissions is depicted in FIGS. 9-11 with a frequency domain extending from left to right.

Figure 9:
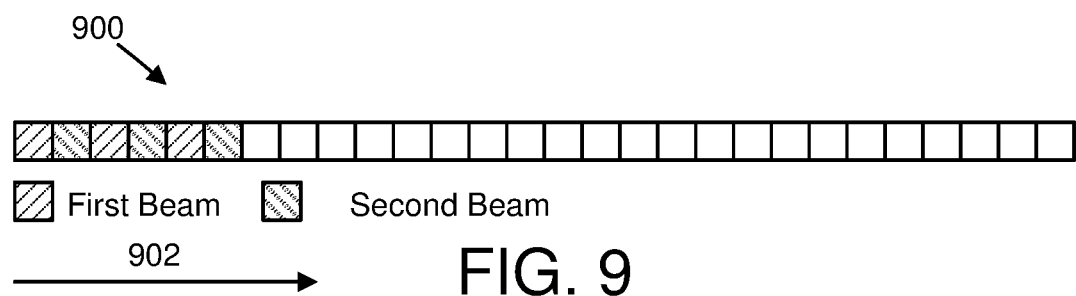
FIG. 9 is a schematic block diagram illustrating one embodiment of frequency domain multiplexing.

FIG. 9 is a schematic block diagram illustrating one embodiment of frequency domain multiplexing 900 along a frequency domain axis 902. FIG. 10 is a schematic block diagram illustrating another embodiment of frequency domain multiplexing 1000. FIG. 11 is a schematic block diagram illustrating a further embodiment of frequency domain multiplexing 1100.

Figure 10:
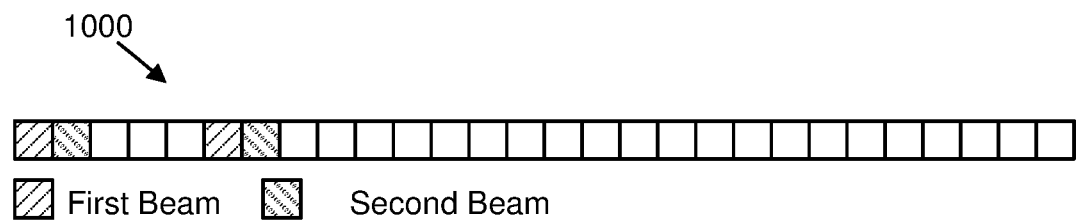
FIG. 10 is a schematic block diagram illustrating another embodiment of frequency domain multiplexing.
Figure 11:
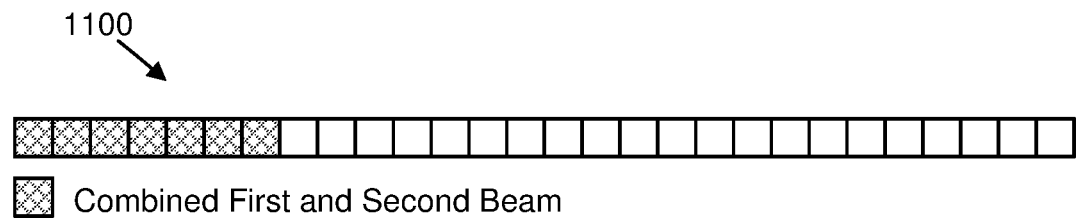
FIG. 11 is a schematic block diagram illustrating a further embodiment of frequency domain multiplexing.

In FIGS. 9 through 11, there is frequency domain multiplexing of multiple sensing RS along the frequency domain axis 902. In FIG. 9 there is continuous allocation in the frequency domain with orthogonal separation. Further, in FIG. 10 there is discontinuous allocation in the frequency domain with orthogonal separation. Moreover, in FIG. 11 there is a non-orthogonal frequency domain allocation for at least a part of the frequency domain content of sensing RSs.

In some embodiments, different sensing RS are separated in the frequency domain. In various embodiments, a sequence for sensing RS with frequency domain separation is adjusted to compensate for a reduced radar processing gain (e.g., by employing a higher transmit power level at all or part of the REs belonging to the multiplexed sensing RS, occupying a larger bandwidth such as by expanding the multiplexed sensing RS among the frequency domain axis, or a combination thereof).

In certain embodiments, frequency domain separation of multiple sensing RSs may include a gap and/or distance, exemplified in FIG. 10, if the sensing RS transmission is not present (e.g., if a data channel and/or control channel transmission is co-existing at the same frequency resource with the gap).

In some embodiments, sensing RS for different transmissions share the same frequency resource. In such embodiments, the separation takes place in a time domain. In some cases of such embodiments, the separation takes place in a spatial domain (e.g., where the TX and/or RX beams carrying and/or receiving different sensing RS associated with different sensing tasks are sufficiently isolated). In various embodiments, the separation takes place in a code and/or sequence domain, where sequences assigned to different sensing RSs facilitate an orthogonal or separable reception and/or processing.

In certain embodiments, a multiplexing configuration for a set of sensing RS patterns corresponding to a set of multiplexed sensing RSs includes a multiple set of quasi-co-location ("QCL") type-D indications to other physical signals and/or RS patterns, a set of parameters defining spatial filters associated with the configured sensing RS patterns, a set of angular information indicating set of beam directions associated with the configured sensing RS patterns, or a set of parameters relatively defining the spatial beams (e.g., relative angular information in reference to a local or known coordinate system, or transformations relatively define a spatial filter with respect to a previous spatial filter (e.g., via x-degree rotation), jointly for the configured sensing RS patterns. In some embodiments, a joint beam pattern is defined via one or multiple parameters from a codebook, where the codebook includes a set of beam group and/or combinations.

In various embodiments, a multiplexing mechanism holds true between two sensing RSs at one portion of the sensing RSs, whereas a different multiplexing mechanism holds true at other portions. As an example, for two sensing RSs overlapping in a portion of a time domain and/or frequency domain, separation may hold true only at the overlapping portion. In certain embodiments, for two sensing RS or a portion thereof, separation may hold true for: the separation in time domain, separation in frequency domain, separation in code sequence domain, separation in spatial domain, or a combination thereof.

In certain embodiments, multiplexing of multiple sensing RS may be configured via a parametric or codebook-based definition of a joint sensing RS behavior (for multiple sensing RSs) in time domain, in frequency domain, or jointly in time and frequency domain. In some embodiments, multiplexing of multiple sensing RS is done via a sequence orthogonalization pattern defined via a code-block group definition in time domain, in frequency domain, or jointly in time and frequency domain including the position and dimension of the code block group, where one orthogonal sequence corresponds to one sensing RS. In various embodiments, if a code block group is defined with an associated orthogonal sequence, the sequence is generated by multiplying a common sequence element among multiple multiplexed sensing RSs into an assigned orthogonal sequence to a specific code block. In certain embodiments, multiplexed sensing RS are separated by assigning different sequence generating parameters (e.g., parameters defining a base generator sequence for a Zadoff-Chu ("ZC") sequence). In some embodiments, a method for multiplexing multiple sensing RS is done by applying a set of harmonic phase rotations along the time domain, along the frequency domain, or jointly in the time and frequency domain. In various embodiments, multiplexing of multiple sensing RS is done by applying different base sequences or other sequence defining parameters for each sensing RS. In any embodiment herein, a set of time and/or frequency phase rotations, orthogonal sequences within code block groups, a set of parameters for the generator sequences. or a combination thereof, are defined jointly via an indication from a codebook where the codebook defines a parameter pattern (e.g., set of phase rotation parameters).

In certain embodiments, sensing RSs belonging to different sensing tasks do not follow the same resource pattern. In such embodiments, a definition of sensing RS multiplexing is accompanied with a definition of a sequence of sensing RS resource patterns. In some embodiments, RS multiplexing for a group of sensing tasks as well as used sensing RS patterns are defined via an index from a codebook, where the codebook includes joint multiplexing and sensing RS patterns for a group of sensing tasks.

In a second embodiment, there may be sensing RS multiplexing with DFT spreading. In the second embodiment, there may be multiplexing in a frequency domain. According to this embodiment, a sensing RS signal is multiplexed in the frequency domain with physical data, control channels, other reference signals, or a combination thereof, where within a common inverse DFT ("IDFT") block, at least some of the multiplexed signals go through a prior DFT spreading process.

Figure 12:
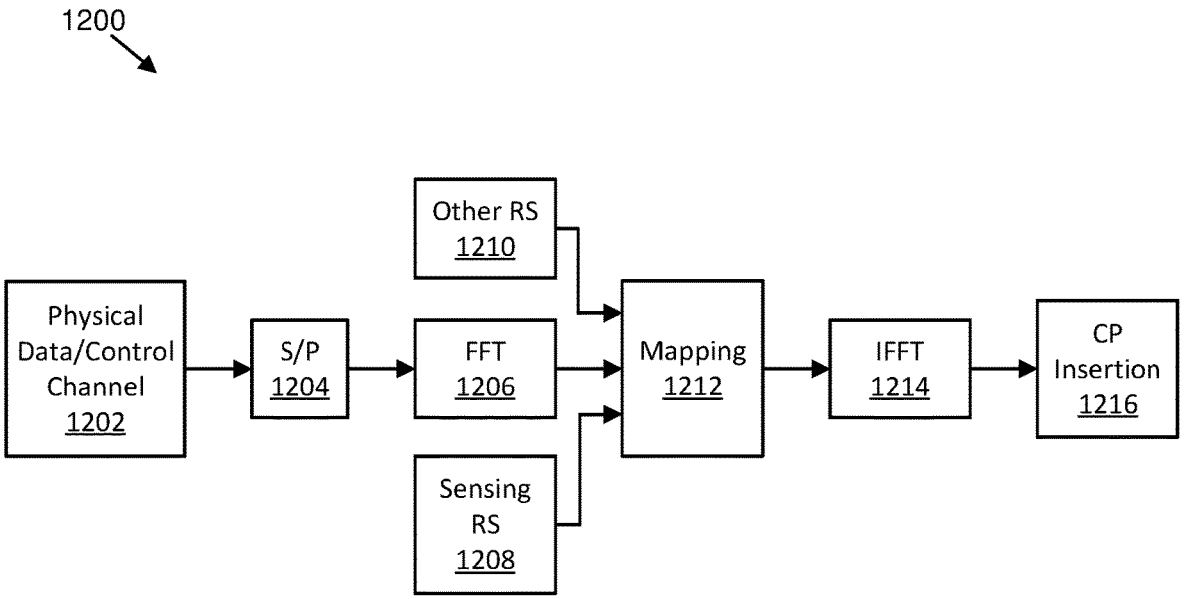
FIG. 12 is a schematic block diagram illustrating one embodiment of a multiplexing system.

FIG. 12 is a schematic block diagram illustrating one embodiment of a multiplexing system 1200. The system 1200 includes a physical data channel and/or control channel 1202 that provides output to a serial-to-parallel converter ("S/P") 1204 which provides output to a fast Fourier transform ("FFT") 1206. The output from the FFT 1206, one or more sensing RS 1208, and one or more other RS 1210 are received by a mapping 1212 which provides output (e.g., N REs) to an inverse FFT ("IFFT") 1214 which provides output to a cyclic prefix ("CP") insertion 1216.

Figure 13:
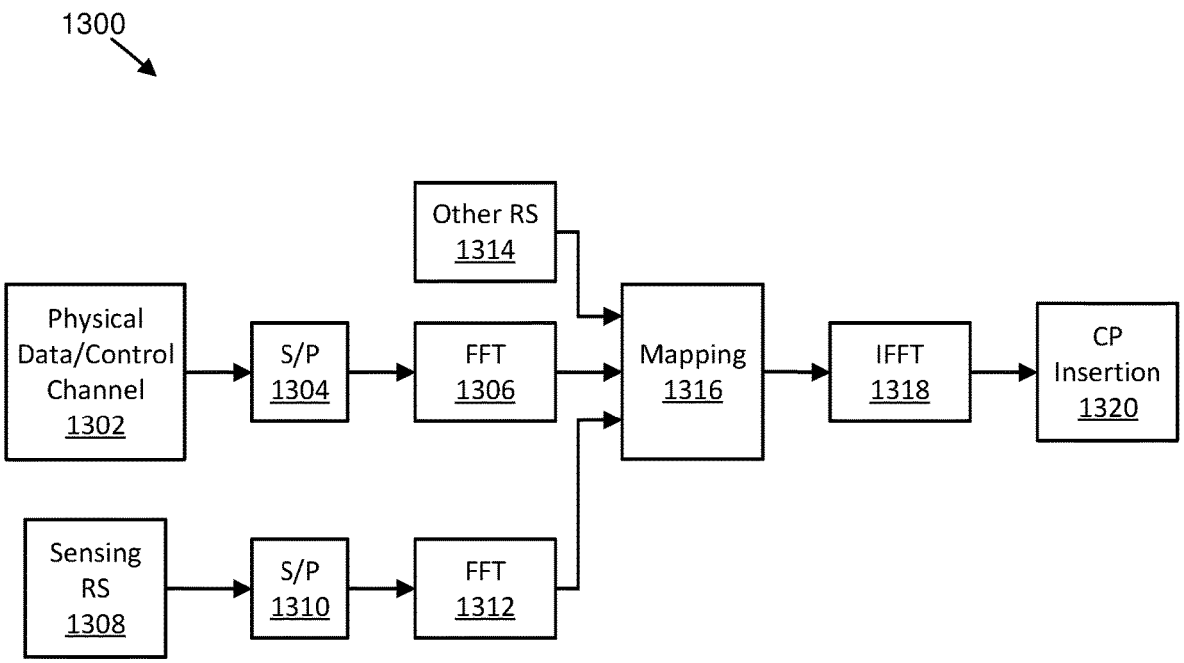
FIG. 13 is a schematic block diagram illustrating another embodiment of a multiplexing system.

FIG. 13 is a schematic block diagram illustrating another embodiment of a multiplexing system 1300. The system 1300 includes a physical data channel and/or control channel 1302 that provides output to a S/P 1304 which provides output to a FFT 1306. The output from the FFT 1306, one or more sensing RS 1308 (e.g., via a S/P 1310 and FFT 1312), and one or more other RS 1314 are received by a mapping 1316 which provides output (e.g., N REs) to an IFFT 1318 which provides output to a CP insertion 1320.

FIGS. 12 and 13 represent examples of possible frequency domain multiplexing configurations for sensing RSs. A multiplexing type #1 of FIG. 12 represents a frequency domain multiplexing without DFT spreading of the sensing RS, where a DFT spreading stage may be applied to the other multiplexed signals. A multiplexing type #2 of FIG. 13 represents a frequency domain multiplexing with a prior DFT spreading segment for the sensing RS, where a DFT spreading stage may or may not be applied to the other multiplexed signals. Multiplexing is done including a mapping procedure defining assigned RE locations for each signal. In a first mapping pattern, elements of the sensing RS are placed such that the sensing REs include the REs at both ends of an available bandwidth, whereas other signals and/or RS may be placed between the segments occupied by the sensing RS. In the first mapping pattern, M REs belonging to a sensing RS are mapped to the start and the end of the available block of N REs. In a second mapping pattern, if present, the sensing RS may occupy the complete block (e.g., either no sensing RS element is used or all of the N REs are mapped using the REs belonging to the sensing RS). In a third mapping pattern, sensing REs are distributed among the sensing REs belonging to other signals. In a fourth and fifth mapping pattern, sensing RS and other signals are superimposed (e.g., occupying similar REs). In this respect, the fifth mapping represents embodiments in which superimposition of the sensing REs and other signals are done only at specific RE locations (e.g., where specific signals are excluded from being superimposed with the sensing RS).

In certain embodiments, there may be pre-DFT-spreading multiplexing for sensing RS. In such embodiments, a sensing RS signal is multiplexed in a pre-spreading stage (e.g., multiplexed prior to a DFT spreading stage) with physical data, control channels, other reference signals, or a combination thereof. The outcome of the DFT spreading stage may or may not be further multiplexed in the frequency domain with other physical data, control channel, and/or reference signals, which together constitute the input to a common length-N IFFT block.

Figure 14:
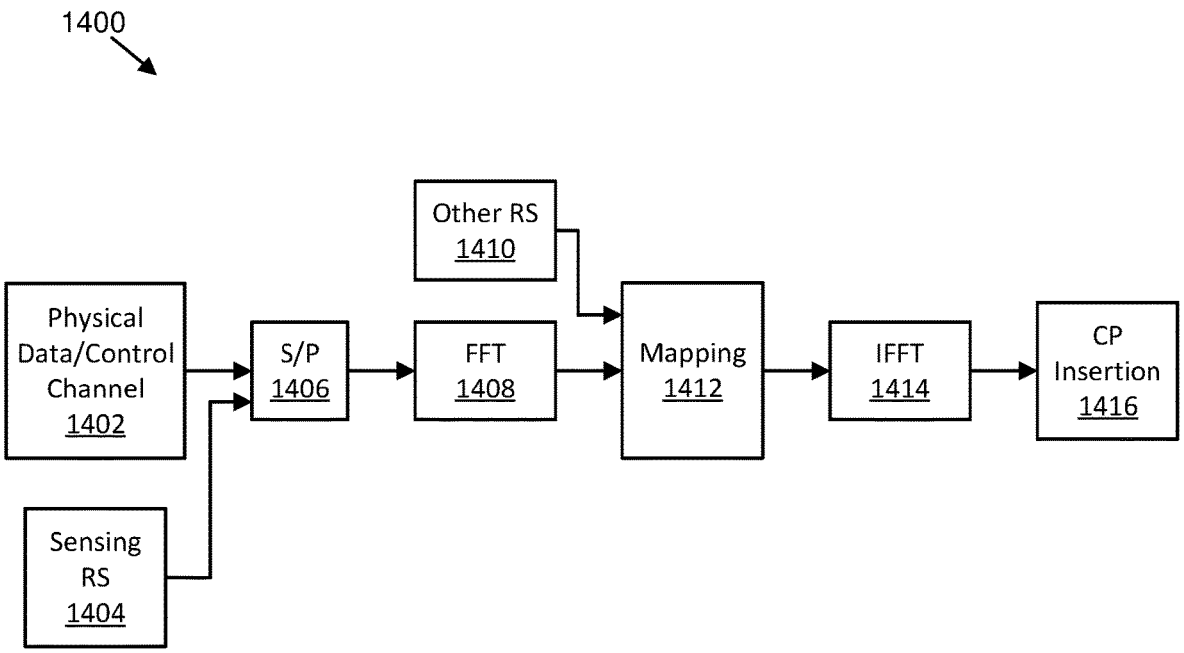
FIG. 14 is a schematic block diagram illustrating a further embodiment of a multiplexing system.

FIG. 14 is a schematic block diagram illustrating a further embodiment of a multiplexing system 1400 (e.g., multiplexing type #3). The system 1400 includes a physical data channel and/or control channel 1402 and one or more sensing RS 1404 that both provide output to a S/P 1406 which provides output to a FFT 1408. The output from the FFT 1408 and one or more other RS 1410 are received by a mapping 1412 which provides output (e.g., N REs) to an IFFT 1414 which provides output to a CP insertion 1416. Multiplexing may be done following any suitable mapping pattern.

In some embodiments, there may be prefiltered-based multiplexing. In such embodiments, the multiplexing of sensing RS with physical data and/or control channels is accomplished with the help of an FFT pre-filtering stage. In this regard, the pre-FFT filter is designed with a criterion to implement an envisioned multiplexing pattern in the frequency domain. In one embodiment corresponding to FIG. 15, the pre-FFT filter is designed such that together with the subsequence FFT block, it generates REs loaded with the desired values from the sensing RS. In another embodiment corresponding to FIG. 16, the pre-FFT filter is designed such that together with the subsequence FFT block it generates "null" REs (e.g., the values of these REs are not important, since they will be later replaced), where the value of the "null" REs are replaced at a mapping stage after the FFT by the desired value within the multiplexed sensing RS. The design and selection of a pre-DFT filter may be done similar to that of other embodiments.

Figure 15:
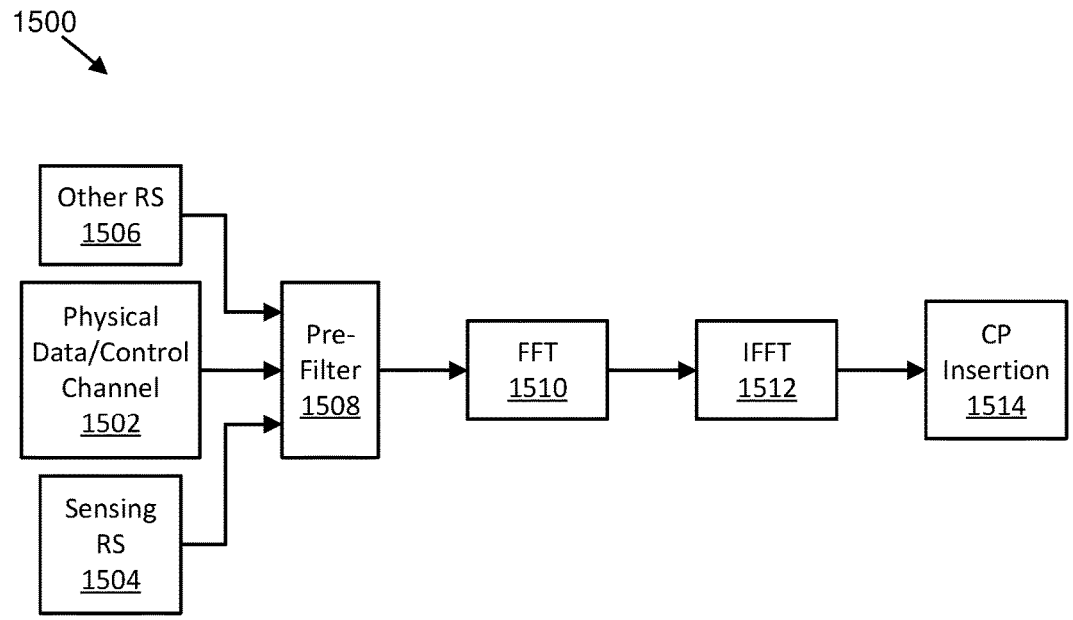
FIG. 15 is a schematic block diagram illustrating yet another embodiment of a multiplexing system.

FIG. 15 is a schematic block diagram illustrating yet another embodiment of a multiplexing system 1500. The system 1500 includes a physical data channel and/or control channel 1502, one or more sensing RS 1504, and one or more other RS 1506 that each provide output to a pre-filter 1508 which provides output to a FFT 1510. The output from the FFT 1510 provides output (e.g., N REs) to an IFFT 1512 which provides output to a CP insertion 1514.

Figure 16:
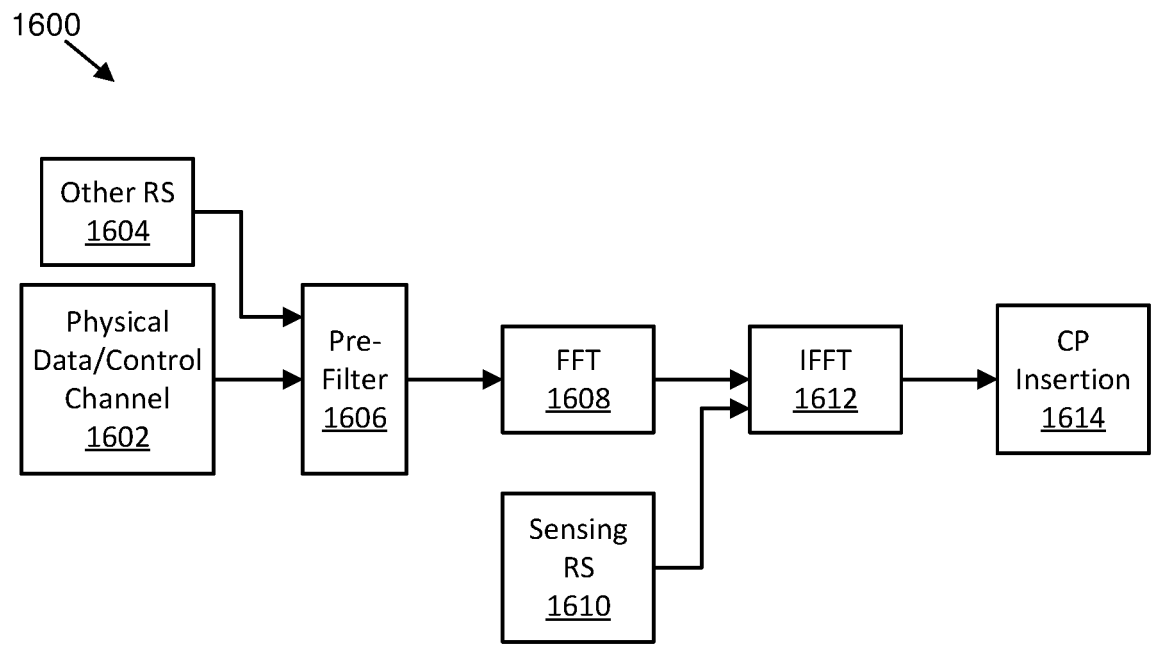
FIG. 16 is a schematic block diagram illustrating an additional embodiment of a multiplexing system.

FIG. 16 is a schematic block diagram illustrating an additional embodiment of a multiplexing system 1600. The system 1600 includes a physical data channel and/or control channel 1602 and one or more other RS 1604 that each provide output to a pre-filter 1606 which provides output to a FFT 1608. The output from the FFT 1608 and one or more sensing RS 1610 provide output (e.g., N REs) to an IFFT 1612 which provides output to a CP insertion 1614. FIGS. 15 and 16 illustrate different embodiments of multiplexing type #4.

In various embodiments, a summary of multiplexing types are given as: 1) multiplexing type #1: frequency domain multiplexing of the sensing RS with other RS and/or data and/or control channels without DFT spreading of the sensing RS; 2) multiplexing type #2: frequency domain multiplexing of the sensing RS with other RS and/or data and/or control channels with a prior DFT spreading of the sensing RS; 3) multiplexing type #3: time-domain (e.g., pre-DFT-spreading) multiplexing of the sensing RS with other RS and/or data and/or control channels; and 4) multiplexing type #4: pre-filtering based multiplexing of sensing RS with data and/or control channels and/or other RS in frequency domain, where the RE locations for sensing RS multiplexing is generated via the combination of the pre-filter and the FFT stage. This type differs from multiplexing type #1 in the use of the pre-filtering stage for multiplexing.

Figure 17:
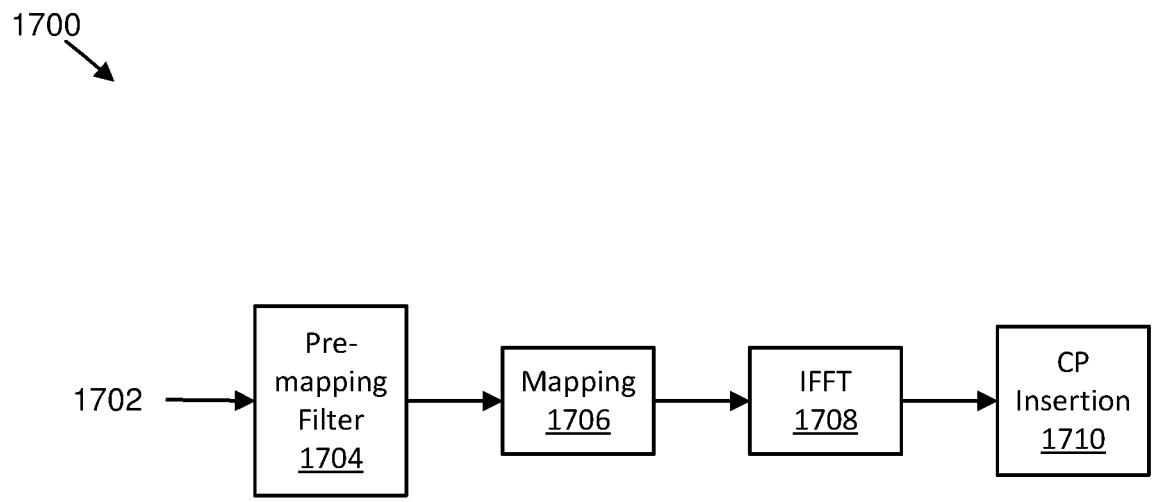
FIG. 17 is a schematic block diagram illustrating one embodiment of a filtering system.

In certain embodiments, there may be DFT-spreading with a pre-mapping filter. In such embodiments, a filtering block is used in the post DFT-spreading stage and prior to the mapping stage to provide further flexibility in the frequency domain shaping of a TX signal. The filtering process include a matrix multiplication of a known square matrix with the vector of REs prior to mapping, a Hadamard multiplication with a vector of the same size as the vector of REs, a known non-linear multi-input multi-output function, or some combination thereof. FIG. 17 illustrates one embodiment of the filtering process.

Specifically, FIG. 17 is a schematic block diagram illustrating one embodiment of a filtering system 1700 with pre-mapping filtered sensing RS multiplexing with a prior DFT spreading stage. The system 1700 includes a post DFT spreading and/or multiplexing output 1702 provided to a pre-mapping filter 1704 which provides output to a mapping 1706. The output from the mapping 1706 provides output (e.g., N REs) to an IFFT 1708 which provides output to a CP insertion 1710.

In some embodiments, a pre-mapping filter is indicated to a sensing RX or nodes receiving multiplexed data and/or RS with a pre-mapping filtering stage, sensing TX nodes, or a combination thereof, via a filter-defining parameter set (e.g., an index from a codebook), where the codebook includes the possible pre-mapping filtering matrices and/or procedure. In various embodiments, a filtering process is applied with no pre DFT-spreading stage. In certain embodiments, a pre-mapping filtering stage is used for a signal without a prior DFT spreading. In some embodiments, supported pre-mapping filter types for transmission or reception or supported multiplexing types for applying a pre-mapping filtering are defined and/or communicated as part of a node capability pattern.

In various embodiments, there may be a combined multiplexing type and/or configuration with or without DFT-spreading. In such embodiments, mapping patterns for frequency and/or time domain multiplexing follow a parameterized or codebook-based definition. In certain embodiments, a portion of sensing RS elements are multiplexed in a time domain (e.g., multiplexing type #3) whereas a portion of the REs are mapped in a frequency domain with or without a DFT spreading stage (e.g., multiplexing type #1, multiplexing type #2), a portion of the REs are mapped using a selected pre-filter as in multiplexing type #4, or a combination thereof. In some embodiments, a block size for sensing RS spreading, a size of the sensing RS REs multiplexed in a pre and/or post DFT spreading stage is defined semi-statically via RRC signaling, or dynamically via DCI signaling. In various embodiments, a group of REs within the sensing RS include information regarding the sensing RS multiplexing configuration and DFT block size within a present symbol. In certain embodiments, configuration information carried within resources within a sensing RS remains valid for multiple symbols, a pattern of the symbols and/or frequency domain resource blocks ("RBs") within the sensing RS for a known segment of the sensing RS. In some embodiments, configuration information is valid for symbols prior to a symbol containing the configuration information. In various embodiments, information regarding a multiplexing configuration and DFT block size are defined via an index from a codebook, where the codebook includes possible multiplexing types, DFT block dimensions, and/or a selected pre-filter (e.g., for multiplexing type #4).

In certain embodiments, if some REs in a pre-DFT spreading or post DFT-spreading stage are allocated to a sensing RS, a co-existing physical channel (e.g., at the same sensing TX node) is rate-matched around allocated REs to sensing RS.

In some embodiments, possible multiplexing configurations for sensing RS at a transmitter or at a receiver, supported DFT sizes applicable for sensing RS, and/or supported DFT spreading for sensing processing as a sensing RX node are indicated as part of a node capability operating as a sensing TX or a sensing RX node.

In various embodiments, if multiple sensing RS are multiplexed by a sensing TX node, sensing RS multiplexing and DFT spreading between a first and a second sensing RS or between any of the sensing RS and the other physical data and/or control channels or other RS, are defined similarly as in other embodiments. In certain embodiments, a subset of a configuration for sensing RS multiplexing and DFT spreading remains similar for different multiplexed sensing RSs. In one implementation, a multiplexing type may be similar for all the multiplexed sensing RSs (e.g., all are multiplexed within a multiplexing type #1, or type #2). In another implementation, one sensing RS is multiplexed following one multiplexing type for one sensing RS and another multiplexing type for another sensing RS.

In some embodiments, a type of sensing processing, expected measurements, and reporting are defined implicitly from a sensing RS from a used codebook. In various embodiments, a defined sensing RS is associated with a known possible sensing processing and measurement and/or reporting requirements, which are indicated (e.g., via an index from a codebook (where the codebook is a function of the sensing RS)) in addition to the sensing RS definition.

It should be noted that embodiments herein are not to be considered only to their DFT-spread realization but instead also to variant embodiments thereof where a DFT and/or FFT processing block is replaced by a generic linear spreading transformation (e.g., complex-valued orthogonal and/or non-orthogonal spreading codes).

In a third embodiment, there may be signaling for a sensing RS configuration and multiplexing. In certain embodiments, there may be sensing RS pattern definition signaling. The definition and/or indication of the sensing RS pattern in both time and/or frequency domain may be configured and/or indicated semi-statically via radio resource control ("RRC") signaling or dynamically via downlink configuration information ("DCI"). In some embodiments, a medium access control ("MAC") control element ("CE") ("MAC-CE") or DCI activation for a specific sensing RS pattern which is semi-persistently configured may accompany additional information on how an activated pattern should be modified in relation to an initial RS pattern definition. In various embodiments, MAC-CE or DCI indications are only used to re-define an RS pattern or to modify the RS pattern in relation to the previous pattern. In certain embodiments, some RS patterns may be defined semi-statically, some RS patterns may be defined dynamically, and dynamically defined RS patterns modify and/or adjust the RS pattern to dynamic sensing needs. In some embodiments, dynamic or semi-static pattern definitions may be separated and/or distinct for each individual parameter, or for time or frequency patterns (e.g., the frequency domain pattern may be defined semi-statically, whereas the time domain pattern may be done dynamically).

In various embodiments, a set of symbol locations are defined as potential sensing locations (e.g., first-stage definition of sensing RS) (e.g., via an indication of the potential sensing signal occasions in a time and frequency domain within a frame structure). In certain embodiments, a similar parameterized definition of a sensing signal resource pattern may be used to define a potential sensing signal symbol and/or RE locations. In some embodiments, potential sensing symbol locations are indicated via an index from a known codebook, augmenting a frame structure with the inclusion of potential sensing symbol locations.

In some embodiments, a modification of radar sensing-specific adjustments on a symbol (e.g., extended time guard band between transmission and reception if the symbol is used for radar sensing) is adopted if the symbol is indicated with the potential for a radar sensing operation. In various embodiments, radar sensing-specific adjustments on a symbol take place when a potential symbol being activated for a radar sensing operation.

In certain embodiments, a subset of sensing RS-defining parameters are configured with one method (e.g., potential sensing RS locations or parameters defining the first-stage sensing RS pattern or frequency domain pattern and the used waveform parameters), are statically defined via RRC signaling, whereas another subset of the sensing RS-defining parameters are configured and/or modified via a different method (e.g., time domain pattern and the utilized beams and/or spatial filters are configured via dynamic indication). In some embodiment, an activation via MAC-CE or DCI signaling is accompanied with the definition of an RS pattern, where a first-stage sensing RS is defined via a prior dynamic or semi-static scheduling command.

In various embodiments, there may be beam and sequence mapping definition signaling. In certain embodiments, different parts of a sensing RS may be mapped via different patterns. In some embodiments, a definition of a mapping type, a maximum time-domain block size, a maximum frequency domain block size, or a subset and/or combination thereof may be defined semi-statically via RRC signaling or dynamically (e.g., via a DCI indication).

In certain embodiments, a QCL assumption for periodic and/or semi-persistent sensing RS may be configured for each sensing RS resource RRC configuration. For an aperiodic sensing RS, a dynamic transmission configuration indicator ("TCI") indication explicitly for sensing RS is transmitted in scheduling and/or activation DCI for the sensing RS.

In some embodiments, a sensing RS may be either semi-persistent, periodic, or aperiodic. If the sensing RS is periodic, then one of the pre-configured sensing RS is indicated, the period duration is indicated, and/or the presence and/or absence of sensing RS in the slots within the period is indicated. Based on this, the sensing RS configuration within the period is determined. For periodic sensing RS configuration, the transmission and/or reception continues, as long as the periodic sensing RS configuration is not released. If sensing RS is semi-persistent, then one of the pre-configured sensing RS is indicated, the period duration is indicated, and/or the presence and/or absence of sensing RS in the slots within the period is indicated. In various embodiments, transmission starts after explicit triggering in the DCI and/or the transmission stops after explicit deactivation. If the sensing RS is aperiodic, then the DCI indicates the one-shot transmission and repetition, if needed.

In various embodiments, a subset of sequence defining parameters is implicitly defined (e.g., calculated at other entities using some known or previously defined parameters). In certain embodiments, sequence-defining parameters are defined semi-statically (e.g., via RRC signaling), or dynamically (e.g., via DCI). In some embodiments, part of sequence-defining parameters are defined semi-statically, whereas part of the parameters are changed and/or defined dynamically.

In various embodiments, use of a pre-mapping filtering stage, a type of an applied filter, and/or a multiplexing type are configured semi-statically (e.g., via an RRC message) or dynamically (e.g., via DCI signaling).

In certain embodiments, there may be scenarios for sensing RS signaling. In such embodiments, sensing configurations are associated with a sensing task including sensing TX nodes-defining parameters, sensing RX nodes-defining parameters, sensing RS-defining parameters, a sensing RS multiplexing type, required sensing measurements and processing to be done by the sensing RS, sensing related reporting types, sensing related reporting resources, or a combination thereof, are communicated from a network to UE nodes via physical DL data, control channels, via RRC signaling, or a combination thereof. The UE nodes include the UE nodes participating in the sensing operation as the sensing TX, sensing RX nodes, a set of non-sensing UE nodes (e.g., when UE nodes are affected by the sensing operation), or a subset and/or combination thereof.

In some embodiments, sensing-related UE capabilities defined or not defined within elements herein and conducted sensing-related measurements may be communicated from a UE to a network via physical UL data and/or control channels. In such embodiments, a functional split between the network and the UE nodes for a specific sensing task may take various forms, depending on the availability of sensing-capable devices and the requirements of the specific sensing operation. The coordination of the network and UE nodes may take any or multiple of the embodiments described herein (at the same time), depending on the scenario.

In various embodiments, there may be a sensing TX as a network node and a sensing RX as a separate network node. In such embodiments, a sensing RS is transmitted and received by network entities. The network indicates the used sensing RS to the other (e.g., non-network) nodes or a subset of the UE nodes via RRC signaling, a physical downlink shared channel ("PDSCH"), a physical downlink control channel ("PDCCH"), DCI signaling, or a group-common DCI if a sensing RS occupies the same resources as other physical channels. In such embodiments, the indication of the sensing RS is used to suppress the received sensing RS by the nodes other than the sensing RX nodes, or used as an indication of sensing-dedicated resources where some of the physical channels may not be present and/or interfered with, or to mute transmissions which are taking place at the same resource to protect the sensing operation, for the purpose of interference measurements from the sensing TX towards the UE nodes or other network devices, or where the sensing RS is indicated to be re-used for other purposes (e.g., as an RS to track some channel state information ("CSI") and/or environment information) by the UE devices, or a combination thereof. In some embodiments, assignment of a sensing RS includes implicit information on a used waveform parameters (e.g., CP and/or guard-band length for the UE nodes), a type of the required sensing processing, and/or a reporting procedure.

In certain embodiments, there may be a sensing TX as a network node and a sensing RX as the same network node. In such embodiments, a sensing RS is transmitted and received by the same network entity using proper duplexing capability (e.g., full-duplex) to enable reception of the echoes transmitted by the same node. In some cases, the network indicates the used sensing RS to the other (e.g., non-network) nodes or a subset of the UE nodes via RRC signaling, PDSCH, or PDCCH and/or DCI signaling or a group-common DCI for the purpose similar to that of other embodiments. In some cases, if the sensing RS and some of the physical DL channels share the same resources, the adjustments on the physical DL channels are indicated to the relevant UE nodes (e.g., the use of additional DMRS patterns to support beam variations if the beam sweeping is combined with the DL transmissions).

In some embodiments, there may be a sensing TX as a network node and a sensing RX as a UE node. In such embodiments, a sensing RS is transmitted by a network entity and received by one or more UE nodes. The network indicates (e.g., implicitly or via direct assignment) to the UE to operate as the sensing RX, including (e.g., but not limited to) the definition of the sensing RS, the type of the sensing measurements, a reporting strategy, and reporting resources. The signaling elements may be done via RRC or dynamically via PDCCH and/or DCI, group-common DCI, or via a part of the sensing RS, or a combination thereof. In various embodiments, information regarding the sensing RS may be communicated to other UE nodes which do not perform as a sensing RX with one of the signaling methods for the similar purposes as defined in other embodiments. In certain embodiments, sensing RS information is used by non-sensing-RX UEs to comply with an updated waveform parameter due to sensing (e.g., modification of CP and/or guard-bands during active sensing periods).

In various embodiments, there may be a sensing TX as a UE node and a sensing RX as a network node. In such embodiments, a sensing RS is transmitted by a UE node and received by a network entity. The network indicates (e.g., implicitly or via direct assignment) to the UE to operate as the sensing TX, including the definition of the sensing RS. The signaling elements may be done via RRC or dynamically via PDCCH and/or DCI, group-common DCI, or via a part of the sensing RS, or a combination thereof. In certain embodiments, information regarding the sensing RS may be communicated to the other UE nodes which do not perform as a sensing RX with one of the signaling methods. In some embodiments, sensing RS information is used by the non-Sensing RX UEs for the successive interference reduction if the same resources are also used for downlink ("DL") or sidelink ("SL") communications. In various embodiments, sensing RS information is used by the non-sensing-RX UEs to comply with an updated waveform parameter due to sensing (e.g., modification of CP and/or guard-bands during active sensing periods).

In certain embodiments, there may be a sensing TX as a UE node and a sensing RX as a separate UE node. In such embodiments, a sensing RS is transmitted by a UE entity and received by another UE node. The network indicates (e.g., implicitly or via direct assignment) to the UE to operate as the sensing RX, the UE to operate as the sensing TX, as well as the definition of the sensing RS, the type of the sensing measurements, a reporting strategy, and/or reporting resources. The signaling elements may be done via RRC or dynamically via PDCCH and/or DCI, group-common DCI, or via a part of the sensing RS, or a combination thereof. In some embodiments, information regarding the sensing RS may be communicated to other UE nodes which do not perform as a sensing RX with one of the signaling methods, for the similar purposes as in other embodiments.

In various embodiments, there may be a sensing TX as a UE node and a sensing RX as the same UE node. In such embodiments, a sensing RS is transmitted by a UE node and received by the same UE node. The network to and/or from UE communication is performed to configure the sensing UE with the sensing RS where the UE jointly performing as the sensing TX and RX with similar signaling possibilities as in other embodiments. In certain embodiments, information regarding the sensing RS may be communicated to other UE nodes which do not perform as a sensing RX with one of the signaling methods, for the similar purposes as in other embodiments.

In certain embodiments, if a sensing RS and some of the physical DL channels share the same resources, adjustments on the physical DL channels may be indicated to the relevant UE nodes (e.g., the use of additional DMRS patterns to support beam variations in case of the beam sweeping combined with the DL transmissions. In some embodiments, the sensing RS information is used by the non-sensing-RX UEs to comply with an updated waveform parameter due to sensing (e.g., modification of CP and/or guard-bands during active sensing periods).

In various embodiments, different sensing RS patterns are defined for different sensing requirements, for different sensing scenarios, for different node capabilities, or a combination thereof. In certain embodiments, a sensing RS is defined for DL transmissions, whereas another sensing RS is defined for the UE transmissions. In some embodiments, a sensing RS definition is different for the scenarios where the sensing RX and sensing TX nodes are the same nodes.

Figure 18:
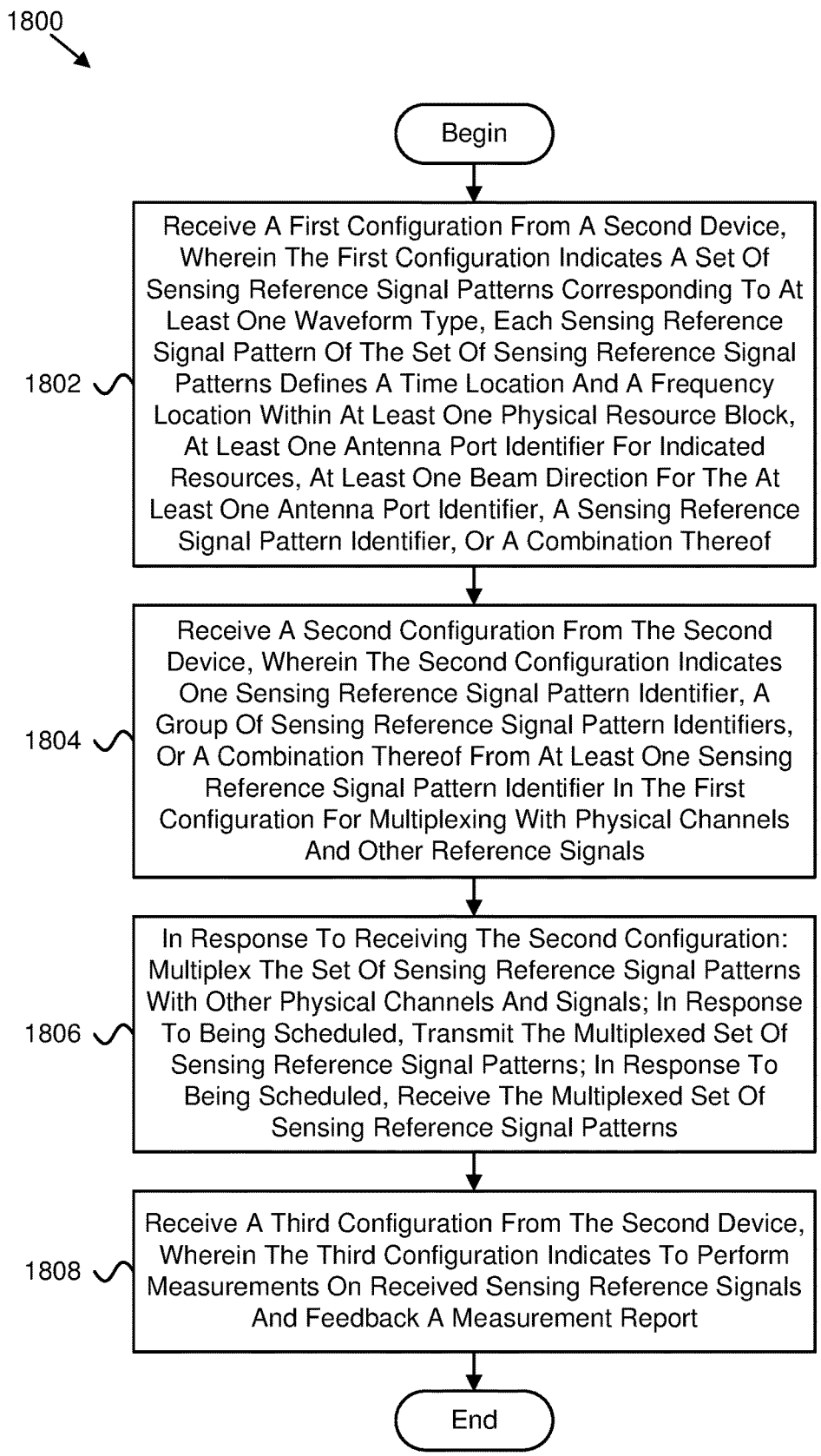
FIG. 18 is a flow chart diagram illustrating one embodiment of a method for sensing reference signal configuration.

FIG. 18 is a flow chart diagram illustrating one embodiment of a method 1800 for sensing reference signal configuration. In some embodiments, the method 1800 is performed by an apparatus, such as the network unit 104. In certain embodiments, the method 1800 may be performed by a processor executing program code, for example, a microcontroller, a microprocessor, a CPU, a GPU, an auxiliary processing unit, a FPGA, or the like.

In various embodiments, the method 1800 includes receiving 1802, at a first device, a first configuration from a second device. The first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof. In certain embodiments, the method 1800 includes receiving 1804 a second configuration from the second device. The second configuration indicates one sensing reference signal pattern identifier, a group of sensing reference to signal pattern identifiers, or a combination thereof from at least one sensing reference signal pattern identifier in the first configuration for multiplexing with physical channels and other reference signals. In some embodiments, the method 1800 includes, in response to receiving the second configuration: multiplexing 1806 the set of sensing reference signal patterns with other physical channels and signals; in response to being scheduled, transmitting the multiplexed set of sensing reference signal patterns; in response to being scheduled, receiving the multiplexed set of sensing reference signal patterns. In various embodiments, the method 1800 includes receiving 1808 a third configuration from the second device. The third configuration indicates to perform measurements on received sensing reference signals and feedback a measurement report.

In certain embodiments, a multiplexing configuration for a sensing reference signal or a set of defined sensing reference signals comprises: a multiplexing pattern in a time domain; a multiplexing pattern in a frequency domain; a multiplexing pattern in the time domain and the frequency domain; a multiplexing pattern in a code domain, a sequence domain, or a combination thereof; or a combination thereof. In some embodiments, a first multiplexing type is defined for multiplexing a first sensing reference signal pattern of the set of sensing reference signal patterns with a first signal, and a second multiplexing type is defined for multiplexing a second sensing reference signal pattern of the set of sensing reference signal patterns with a second signal.

In various embodiments, a first multiplexing type is defined for multiplexing part of a sensing reference signal pattern of the set of sensing reference signal patterns with a second signal, and a second multiplexing type is defined for multiplexing another part of the sensing reference signal pattern with a second signal.

In one embodiment, a time domain multiplexing configuration for the set of sensing reference signal patterns comprises: multiple time domain patterns; a time domain pattern and a parameter set defining other sensing reference signal patterns relatively to a first sensing reference signal pattern (including, e.g., the distance and/or separation in time domain of a sensing RS to a previous one, a parameter defining how a subsequent pattern is modified with respect to a previous pattern, a single distance value when the time-domain separation is similar/constant among all); an index, a parameter set, or a combination thereof defining the set of sensing reference signal patterns with a time domain separation pattern from a codebook; or a combination thereof.

In certain embodiments, a frequency domain multiplexing configuration for the set of sensing reference signal patterns comprises: multiple frequency domain patterns; a frequency domain pattern and a parameter set defining other sensing reference signal patterns relatively to a first sensing reference signal pattern (including, e.g., the distance and/or separation in frequency of a sensing RS to a previous one, a parameter defining how a pattern is modified with respect to a previous pattern); an index, a parameter set, or a combination thereof defining the set of sensing reference signal patterns with a frequency domain separation pattern from a codebook; or a combination thereof.

In some embodiments, a joint time domain and frequency domain multiplexing (e.g., a multiplexing type when a first sensing RS and a second RS are separated at some symbols in frequency domain and are separate in time domain at some shared frequency domain RE locations) configuration for the set of sensing reference signal patterns comprises: multiple joint time domain and frequency domain patterns; a joint time domain and frequency domain pattern and a parameter set defining other sensing reference signal patterns relatively to a first sensing reference signal pattern; an index, a parameter set, or a combination thereof defining the set of sensing reference signal patterns with joint time and frequency domain separation from a codebook; or a combination thereof.

In various embodiments, beam defining parameters corresponding to a sensing reference signal pattern of the set of sensing reference signal patterns comprises: a quasi-co-location type-D indication to a previously used reference signal, a data channel, a control channel, or some combination thereof; an index from a codebook defining linear or non-linear spatial filters; absolute angular information defining a beam direction with respect to a local coordinate system of the first device or a coordinate system known by the first device; relative angular information defining the beam direction in relation to a previously defined beam; spatial filter transformation in relation to the previously defined beam; usage of an indicated beam (e.g., if the beam is within the sensing RS transmitting beams or among the sensing RS receiving beams, or jointly among the sensing RS transmitting and receiving beams, or among the beams used for sending the sensing measurement reports); or a combination thereof.

In one embodiment, a multiplexing configuration for the set of sensing reference signal patterns comprises: multiple sets of quasi-co-location type-D indications to other physical signals, reference signal patterns, or a combination thereof; a set of parameters defining spatial filters associated with the set of sensing reference signal patterns; a set of angular information indicating a set of beam directions associated with the set of sensing reference signal patterns; a set of parameters relatively defining spatial beams (e.g., relative angular information with respect to a local or known coordinate system, or transformations relatively define a spatial filter with respect to a previous spatial filter (e.g., via x-degree rotation)) jointly for the set of sensing reference signal patterns; or some combination thereof.

In certain embodiments, an indicated beam pattern comprises: a beam pattern for reception of multiplexed set of sensing reference signal patterns; a beam pattern for transmission of the multiplexed set of sensing reference signal patterns; a beam pattern for joint transmission and reception of the multiplexed set of sensing reference signal patterns; or some combination thereof.

In some embodiments, a multiplexing configuration for multiple sensing reference signals comprises: a joint definition of a set of code block group patterns along a time domain, a frequency domain, or the time domain and the frequency domain (e.g., including the length in time domain or length in frequency domain or combination of both); a joint indication of a set of orthogonal sequences within each code block group assigned to each sensing reference signal pattern of the set of sensing reference signal patterns (the orthogonal sequences defined, e.g., via a parameterization as time-domain length, frequency domain length, total block size in number of REs and the type of the orthogonal sequence, by indicating a set of sequence-defining parameters defined relatively); a joint indication of sequences generating different base sequences for each sensing reference signal of the set of sensing reference signal patterns; or some combination thereof.

In various embodiments, a multiplexing configuration for multiple sensing reference signal patterns comprises: a joint definition of a set of harmonic multiplications along a time domain assigned to different sensing reference signal sequences (phase rotation proportional to the time-domain displacement of a sensing RS sequence value; the joint definition indicates, e.g., relative definition/parameterization of the harmonic multiplications, where multiple harmonics are defined with an order, an initial harmonic frequency along the time domain and a step-size value: harmonics (0, f0, 2f0, . . . N f0) along the time domain is defined via the parameterization (f0, N). this is similarly applicable for the frequency domain and for the joint time/frequency domain definitions); a joint definition of a set of harmonic multiplications along a frequency domain assigned to different sensing reference signal sequences (e.g., phase rotation proportional to the freq.-domain displacement of a sensing RS sequence value); a joint definition of a set of harmonic multiplications jointly along the time domain and the frequency domain assigned to different sensing reference signal sequences; a joint definition of a set of linear time filters, frequency filters, or a combination thereof applied to different sensing reference signal sequence values; or some combination thereof.

In one embodiment, the method 1800 further comprises: receiving a configuration from the second device defining a size of a discrete Fourier transform spreading stage applied on a sensing reference signal after a serial-to-parallel conversion of a sensing reference signal sequence value; and applying the discrete Fourier transform spreading stage on the sensing reference signal after the serial-to-parallel conversion of the sensing reference signal sequence value according to the received configuration. In certain embodiments, a multiplexing configuration is applied between a first sensing reference signal pattern and: a second sensing reference signal pattern; anon-sensing reference signal; a physical data channel; a control channel; or some combination thereof prior to a discrete Fourier transform spreading stage applied to a multiplexed signal. In some embodiments, a multiplexing configuration is applied between at least two signals after a discrete Fourier transform spreading stage.

In various embodiments: a first multiplexing configuration is applied between a first sensing reference signal and: a second sensing reference signal; a non-sensing reference signal; a data channel; a control channel; or some combination thereof prior to a discrete Fourier transform spreading stage being applied to a multiplexed signal via the first multiplexing configuration; and a second multiplexing configuration is applied between at least two signals (e.g., multiplexed with another multiplexing type) after the discrete Fourier transform spreading stage (e.g., the dimension of the DFT block, the frequency placement domain placement of the DFT block with respect to the input signal (the range and order of the REs input to the DFT block), the frequency domain placement of the DFT block with respect to the output signal (the range and order of the REs output from the DFT block)).

In one embodiment, a sensing reference signal joint multiplexing and discrete Fourier transform spreading configuration is defined via a filtering configuration prior to a discrete Fourier transform spreading stage, and the filtering configuration comprises: a dimension of a pre-discrete Fourier transform filter; a signal input combination (e.g., a first sensing RS with dimensions d1, a data and/or control channel with dimension d2, another sensing RS or another RS with dimension d3, and so forth); a frequency domain placement of the pre-discrete Fourier transform filter with respect to an input signal (e.g., the range and order of the REs input to the filter); a frequency domain placement of the pre-discrete Fourier transform filter with respect to an output signal (e.g., the range and order of the REs output to the filter); a type of multiplexing for a filter output; a filter type; a parameter set defining the filter type, a dimension, a position, or a combination thereof via a pre-defined codebook; or some combination thereof.

In certain embodiments, the method 1800 further comprises: receiving a configuration defining a pre-inverse fast Fourier transfer filtering stage comprising: a filter dimension; a filter type; and a parameter set defining the filter type, the filter dimension, a position via a pre-defined codebook; and applying the pre-inverse fast Fourier transfer filtering stage.

In some embodiments: sensing reference signal parameters are configured with periodic resources via radio resource control signaling; the sensing reference signal parameters are configured semi-statically via radio resource control signaling with a semi-persistent sensing reference signal resource pattern and dynamically activated via physical downlink control channel downlink control information, via a physical downlink shared channel, via a medium access control control element, or some combination thereof; the sensing reference signal parameters are configured dynamically and periodically via physical downlink control channel downlink control information or a physical downlink shared channel; the sensing reference signal parameters are configured via multicast or a broadcast-type signaling (e.g., via a PDCCH DCI with CRC scrambled via a group-common radio network temporary identifier ("RNTI"), physical broadcast channel ("PBCH") and/or SIB type signaling); or some combination thereof.

In various embodiments, a first part of the sensing reference signal parameters are configured semi-statically via radio resource control signaling, and a second part of the sensing reference signal parameters are configured dynamically via physical downlink control channel downlink control information or via physical downlink shared channel signaling.

In one embodiment, a dynamically or semi-statically configured sensing reference signal parameters or a subset thereof are modified via a dynamically received configuration via physical downlink control channel downlink control information or via physical downlink shared channel, and the dynamic configuration comprises: a set of parameters to replace the sensing reference signal parameters; a set of parameters to relatively define the set of sensing reference signal parameters or a subset thereof with a combination type; a resource pattern in a time domain, in a frequency domain, or in the time domain and the frequency domain, wherein the resource pattern is combined with a current sensing reference signal pattern to construct a new pattern together with a combination type; or some combination thereof.

In certain embodiments, sensing reference signal multiplexing parameters are defined: semi-statically via radio resource control signaling; dynamically via physical downlink control channel downlink control information or a physical downlink shared channel message; dynamically via the physical downlink control channel downlink control information, with a cyclic redundancy check scrambled with group common downlink control information, or via broadcast-type signaling (e.g., when a group of sensing Rx nodes are receiving the sensing RS, via SIB message, and so forth); dynamically via a subset of sensing reference signal resource elements; or some combination thereof.

In some embodiments, a first subset of the sensing reference signal multiplexing parameters are defined via a first signaling type (e.g., dynamically via DCI or PDSCH or via RRC) and a second subset of the sensing reference signal multiplexing parameters are defined via a second signaling type (e.g., the placement of the DFT spreading is defined via RRC but the dimension and the involved signals in the multiplexing is defined dynamically, or the time domain behavior of multiple sensing RS patterns are dynamically configured, whereas the freq. domain behaviors are RRC configured).

In various embodiments, the method 1800 further comprises a set of parameters defining a modification of a first sensing reference signal multiplexing configuration, wherein the first configuration is defined semi-statically or dynamically, and an additional parameter set is defined: dynamically via physical downlink control channel downlink control information or a physical downlink shared channel message; dynamically via physical downlink control channel downlink control information or with a cyclic redundancy check scrambled with group common downlink control information (e.g., when a group of sensing RX nodes are receiving the sensing RS); or some combination thereof.

In one embodiment, the method 1800 further comprises information indicating an identifier number: for a sensing reference signal pattern; for a group of sensing reference signal patterns; for a reference signal resource pattern in a time domain; for a reference signal resource pattern in a frequency domain; for a reference signal resource pattern jointly in the time domain and the frequency domain; for a reference signal beam pattern; for a sensing reference signal sequence; for a sensing reference signal sequence mapping strategy to a physical resource; or some combinations thereof.

In certain embodiments, a joint multiplexing configuration for multiple sensing reference signals comprises: a joint identifier number (e.g., identifying the defined group of sensing RS transmission and/or receptions); a joint measurement type (e.g., different sensing RS pattern configurations are intended to jointly observe one or multiple environment feature, e.g., existence of a blockage at any point of an angular range); a joint reporting criterion (e.g., report on a condition defined jointly on the group of sensing RS transmission/reception/measurements, if any of the sensing RS patterns observe an object in d1-m distance and/or v1 m/sec speed in a defined direction); a joint reporting type (e.g., reporting a joint measurement/observation via the multiple sensing RS); joint time reporting resources; joint frequency reporting resources; joint beam reporting resources (e.g., reporting the measurements from the multiple sensing RSs via a same reporting message); or some combination thereof.

Figure 19:
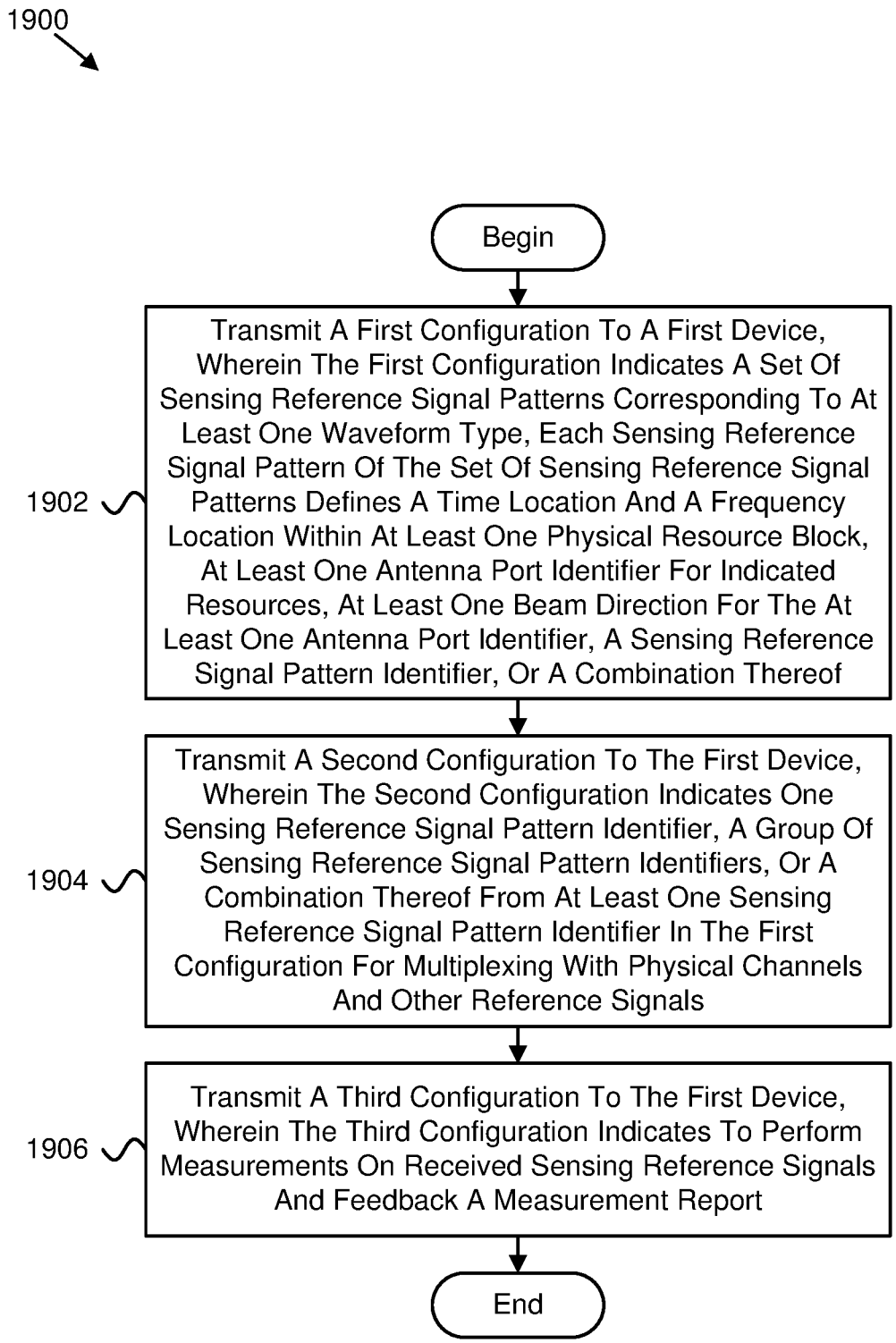
FIG. 19 is a flow chart diagram illustrating another embodiment of a method for sensing reference signal configuration.

FIG. 19 is a flow chart diagram illustrating another embodiment of a method 1900 for sensing reference signal configuration. In some embodiments, the method 1900 is performed by an apparatus, such as the network unit 104. In certain embodiments, the method 1900 may be performed by a processor executing program code, for example, a microcontroller, a microprocessor, a CPU, a GPU, an auxiliary processing unit, a FPGA, or the like.

In various embodiments, the method 1900 includes transmitting 1902, from a second device, a first configuration to a first device. The first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof. In some embodiments, the method 1900 includes transmitting 1904 a second configuration to the first device. The second configuration indicates one sensing reference signal pattern identifier, a group of sensing reference signal pattern identifiers, or a combination thereof from at least one sensing reference signal pattern identifier in the first configuration for multiplexing with physical channels and other reference signals. In certain embodiments, the method 1900 includes transmitting 1906 a third configuration to the first device. The third configuration indicates to perform measurements on received sensing reference signals and feedback a measurement report.

In certain embodiments, the method 1900 further comprises transmitting a configuration to the first device defining a size of a discrete Fourier transform spreading stage applied on a sensing reference signal after a serial-to-parallel conversion of a sensing reference signal sequence value. In some embodiments, the method 1900 further comprises transmitting a configuration defining a pre-inverse fast Fourier transfer filtering stage comprising: a filter dimension; a filter type; and a parameter set defining the filter type, the filter dimension, a position via a pre-defined codebook.

In one embodiment, a method of a first device comprises: receiving a first configuration from a second device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; receiving a second configuration from the second device, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; in response to receiving the second configuration: multiplexing the set of sensing reference signal patterns with other physical channels and signals; in response to being scheduled, transmitting the multiplexed set of sensing reference signal patterns; in response to being scheduled, receiving the multiplexed set of sensing reference signal patterns; and receiving a third configuration from the second device, wherein the third configuration indicates to perform measurements on received sensing reference signals and feedback a measurement report (e.g., indicating detection of at least one object, blockage of at least one beam, a range of the at least one detected objected, a speed of a detected object, a shape of the detected object, a composite of a detected object, or some combination thereof).

In certain embodiments, a multiplexing configuration for a sensing reference signal or a set of defined sensing reference signals comprises: a multiplexing pattern in a time domain; a multiplexing pattern in a frequency domain; a multiplexing pattern in the time domain and the frequency domain; a multiplexing pattern in a code domain, a sequence domain, or a combination thereof; or a combination thereof.

In some embodiments, a first multiplexing type is defined for multiplexing a first sensing reference signal pattern of the set of sensing reference signal patterns with a first signal, and a second multiplexing type is defined for multiplexing a second sensing reference signal pattern of the set of sensing reference signal patterns with a second signal.

In various embodiments, a first multiplexing type is defined for multiplexing part of a sensing reference signal pattern of the set of sensing reference signal patterns with a second signal, and a second multiplexing type is defined for multiplexing another part of the sensing reference signal pattern with a second signal.

In one embodiment, a time domain multiplexing configuration for the set of sensing reference signal patterns comprises: multiple time domain patterns; a time domain pattern and a parameter set defining other sensing reference signal patterns relatively to a first sensing reference signal pattern (including, e.g., the distance and/or separation in time domain of a sensing RS to a previous one, a parameter defining how a subsequent pattern is modified with respect to a previous pattern, a single distance value when the time-domain separation is similar/constant among all); an index, a parameter set, or a combination thereof defining the set of sensing reference signal patterns with a time domain separation pattern from a codebook; or a combination thereof.

In certain embodiments, a frequency domain multiplexing configuration for the set of sensing reference signal patterns comprises: multiple frequency domain patterns; a frequency domain pattern and a parameter set defining other sensing reference signal patterns relatively to a first sensing reference signal pattern (including, e.g., the distance and/or separation in frequency of a sensing RS to a previous one, a parameter defining how a pattern is modified with respect to a previous pattern); an index, a parameter set, or a combination thereof defining the set of sensing reference signal patterns with a frequency domain separation pattern from a codebook; or a combination thereof.

In some embodiments, a joint time domain and frequency domain multiplexing (e.g., a multiplexing type when a first sensing RS and a second RS are separated at some symbols in frequency domain and are separate in time domain at some shared frequency domain RE locations) configuration for the set of sensing reference signal patterns comprises: multiple joint time domain and frequency domain patterns; a joint time domain and frequency domain pattern and a parameter set defining other sensing reference signal patterns relatively to a first sensing reference signal pattern; an index, a parameter set, or a combination thereof defining the set of sensing reference signal patterns with joint time and frequency domain separation from a codebook; or a combination thereof.

In various embodiments, beam defining parameters corresponding to a sensing reference signal pattern of the set of sensing reference signal patterns comprises: a quasi-co-location type-D indication to a previously used reference signal, a data channel, a control channel, or some combination thereof; an index from a codebook defining linear or non-linear spatial filters; absolute angular information defining a beam direction with respect to a local coordinate system of the first device or a coordinate system known by the first device; relative angular information defining the beam direction in relation to a previously defined beam; spatial filter transformation in relation to the previously defined beam; usage of an indicated beam (e.g., if the beam is within the sensing RS transmitting beams or among the sensing RS receiving beams, or jointly among the sensing RS transmitting and receiving beams, or among the beams used for sending the sensing measurement reports); or a combination thereof.

In one embodiment, a multiplexing configuration for the set of sensing reference signal patterns comprises: multiple sets of quasi-co-location type-D indications to other physical signals, reference signal patterns, or a combination thereof; a set of parameters defining spatial filters associated with the set of sensing reference signal patterns; a set of angular information indicating a set of beam directions associated with the set of sensing reference signal patterns; a set of parameters relatively defining spatial beams (e.g., relative angular information with respect to a local or known coordinate system, or transformations relatively define a spatial filter with respect to a previous spatial filter (e.g., via x-degree rotation)) jointly for the set of sensing reference signal patterns; or some combination thereof.

In certain embodiments, an indicated beam pattern comprises: a beam pattern for reception of multiplexed set of sensing reference signal patterns; a beam pattern for transmission of the multiplexed set of sensing reference signal patterns; a beam pattern for joint transmission and reception of the multiplexed set of sensing reference signal patterns; or some combination thereof.

In some embodiments, a multiplexing configuration for multiple sensing reference signals comprises: a joint definition of a set of code block group patterns along a time domain, a frequency domain, or the time domain and the frequency domain (e.g., including the length in time domain or length in frequency domain or combination of both); a joint indication of a set of orthogonal sequences within each code block group assigned to each sensing reference signal pattern of the set of sensing reference signal patterns (the orthogonal sequences defined, e.g., via a parameterization as time-domain length, frequency domain length, total block size in number of REs and the type of the orthogonal sequence, by indicating a set of sequence-defining parameters defined relatively); a joint indication of sequences generating different base sequences for each sensing reference signal of the set of sensing reference signal patterns; or some combination thereof.

In various embodiments, a multiplexing configuration for multiple sensing reference signal patterns comprises: a joint definition of a set of harmonic multiplications along a time domain assigned to different sensing reference signal sequences (phase rotation proportional to the time-domain displacement of a sensing RS sequence value; the joint definition indicates, e.g., relative definition/parameterization of the harmonic multiplications, where multiple harmonics are defined with an order, an initial harmonic frequency along the time domain and a step-size value: harmonics (0, f0, 2f0, . . . N f0) along the time domain is defined via the parameterization (f0, N). this is similarly applicable for the frequency domain and for the joint time/frequency domain definitions); a joint definition of a set of harmonic multiplications along a to frequency domain assigned to different sensing reference signal sequences (e.g., phase rotation proportional to the freq.-domain displacement of a sensing RS sequence value); a joint definition of a set of harmonic multiplications jointly along the time domain and the frequency domain assigned to different sensing reference signal sequences; a joint definition of a set of linear time filters, frequency filters, or a combination thereof applied to different sensing reference signal sequence values; or some combination thereof.

In one embodiment, the method further comprises: receiving a configuration from the second device defining a size of a discrete Fourier transform spreading stage applied on a sensing reference signal after a serial-to-parallel conversion of a sensing reference signal sequence value; and applying the discrete Fourier transform spreading stage on the sensing reference signal after the serial-to-parallel conversion of the sensing reference signal sequence value according to the received configuration.

In certain embodiments, a multiplexing configuration is applied between a first sensing reference signal pattern and: a second sensing reference signal pattern; a non-sensing reference signal; a physical data channel; a control channel; or some combination thereof prior to a discrete Fourier transform spreading stage applied to a multiplexed signal.

In some embodiments, a multiplexing configuration is applied between at least two signals after a discrete Fourier transform spreading stage.

In various embodiments: a first multiplexing configuration is applied between a first sensing reference signal and: a second sensing reference signal; a non-sensing reference signal; a data channel; a control channel; or some combination thereof prior to a discrete Fourier transform spreading stage being applied to a multiplexed signal via the first multiplexing configuration; and a second multiplexing configuration is applied between at least two signals (e.g., multiplexed with another multiplexing type) after the discrete Fourier transform spreading stage (e.g., the dimension of the DFT block, the frequency placement domain placement of the DFT block with respect to the input signal (the range and order of the REs input to the DFT block), the frequency domain placement of the DFT block with respect to the output signal (the range and order of the REs output from the DFT block)).

In one embodiment, a sensing reference signal joint multiplexing and discrete Fourier transform spreading configuration is defined via a filtering configuration prior to a discrete Fourier transform spreading stage, and the filtering configuration comprises: a dimension of a pre-discrete Fourier transform filter; a signal input combination (e.g., a first sensing RS with dimensions d1, a data and/or control channel with dimension d2, another sensing RS or another RS with dimension d3, and so forth); a frequency domain placement of the pre-discrete Fourier transform filter with respect to an input signal (e.g., the range and order of the REs input to the filter); a frequency domain placement of the pre-discrete Fourier transform filter with respect to an output signal (e.g., the range and order of the REs output to the filter); a type of multiplexing for a filter output; a filter type; a parameter set defining the filter type, a dimension, a position, or a combination thereof via a pre-defined codebook; or some combination thereof.

In certain embodiments, the method further comprises: receiving a configuration defining a pre-inverse fast Fourier transfer filtering stage comprising: a filter dimension; a filter type; and a parameter set defining the filter type, the filter dimension, a position via a pre-defined codebook; and applying the pre-inverse fast Fourier transfer filtering stage.

In some embodiments: sensing reference signal parameters are configured with periodic resources via radio resource control signaling; the sensing reference signal parameters are configured semi-statically via radio resource control signaling with a semi-persistent sensing reference signal resource pattern and dynamically activated via physical downlink control channel downlink control information, via a physical downlink shared channel, via a medium access control control element, or some combination thereof; the sensing reference signal parameters are configured dynamically and periodically via physical downlink control channel downlink control information or a physical downlink shared channel; the sensing reference signal parameters are configured via multicast or a broadcast-type signaling (e.g., via a PDCCH DCI with cyclic redundancy check ("CRC") scrambled via a group-common RNTI, PBCH and/or SIB type signaling); or some combination thereof.

In various embodiments, a first part of the sensing reference signal parameters are configured semi-statically via radio resource control signaling, and a second part of the sensing reference signal parameters are configured dynamically via physical downlink control channel downlink control information or via physical downlink shared channel signaling.

In one embodiment, a dynamically or semi-statically configured sensing reference signal parameters or a subset thereof are modified via a dynamically received configuration via physical downlink control channel downlink control information or via physical downlink shared channel, and the dynamic configuration comprises: a set of parameters to replace the sensing reference signal parameters; a set of parameters to relatively define the set of sensing reference signal parameters or a subset thereof with a combination type; a resource pattern in a time domain, in a frequency domain, or in the time domain and the frequency domain, wherein the resource pattern is combined with a current sensing reference signal pattern to construct a new pattern together with a combination type; or some combination thereof.

In certain embodiments, sensing reference signal multiplexing parameters are defined: semi-statically via radio resource control signaling; dynamically via physical downlink control channel downlink control information or a physical downlink shared channel message; dynamically via the physical downlink control channel downlink control information, with a cyclic redundancy check scrambled with group common downlink control information, or via broadcast-type signaling (e.g., when a group of sensing Rx nodes are receiving the sensing RS, via SIB message, and so forth); dynamically via a subset of sensing reference signal resource elements; or some combination thereof.

In some embodiments, a first subset of the sensing reference signal multiplexing parameters are defined via a first signaling type (e.g., dynamically via DCI or PDSCH or via RRC) and a second subset of the sensing reference signal multiplexing parameters are defined via a second signaling type (e.g., the placement of the DFT spreading is defined via RRC but the dimension and the involved signals in the multiplexing is defined dynamically, or the time domain behavior of multiple sensing RS patterns are dynamically configured, whereas the freq. domain behaviors are RRC configured).

In various embodiments, the method further comprises a set of parameters defining a modification of a first sensing reference signal multiplexing configuration, wherein the first configuration is defined semi-statically or dynamically, and an additional parameter set is defined: dynamically via physical downlink control channel downlink control information or a physical downlink shared channel message; dynamically via physical downlink control channel downlink control information or with a cyclic redundancy check scrambled with group common downlink control information (e.g., when a group of sensing RX nodes are receiving the sensing RS); or some combination thereof.

In one embodiment, the method further comprises information indicating an identifier number: for a sensing reference signal pattern; for a group of sensing reference signal patterns; for a reference signal resource pattern in a time domain; for a reference signal resource pattern in a frequency domain; for a reference signal resource pattern jointly in the time domain and the frequency domain; for a reference signal beam pattern; for a sensing reference signal sequence; for a sensing reference signal sequence mapping strategy to a physical resource; or some combinations thereof.

In certain embodiments, a joint multiplexing configuration for multiple sensing reference signals comprises: a joint identifier number (e.g., identifying the defined group of sensing RS transmission and/or receptions); a joint measurement type (e.g., different sensing RS pattern configurations are intended to jointly observe one or multiple environment feature, e.g., existence of a blockage at any point of an angular range); a joint reporting criterion (e.g., report on a condition defined jointly on the group of sensing RS transmission/reception/measurements, if any of the sensing RS patterns observe an object in d1-m distance and/or v1 m/sec speed in a defined direction); a joint reporting type (e.g., reporting a joint measurement/observation via the multiple sensing RS); joint time reporting resources; joint frequency reporting resources; joint beam reporting resources (e.g., reporting the measurements from the multiple sensing RSs via a same reporting message); or some combination thereof.

In one embodiment, an apparatus comprises a first device. The apparatus further comprises: a receiver that: receives a first configuration from a second device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; and receives a second configuration from the second device, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; a processor; and a transmitter. In response to receiving the second configuration: the processor multiplexes the set of sensing reference signal patterns with other physical channels and signals; the transmitter, in response to being scheduled, transmits the multiplexed set of sensing reference signal patterns; and the receiver, in response to being scheduled, receives the multiplexed set of sensing reference signal patterns; and the receiver receives a third configuration from the second device, wherein the third configuration indicates to perform measurements on received sensing reference signals and feedback a measurement report.

In certain embodiments, a multiplexing configuration for a sensing reference signal or a set of defined sensing reference signals comprises: a multiplexing pattern in a time domain; a multiplexing pattern in a frequency domain; a multiplexing pattern in the time domain and the frequency domain; a multiplexing pattern in a code domain, a sequence domain, or a combination thereof; or a combination thereof.

In some embodiments, a first multiplexing type is defined for multiplexing a first sensing reference signal pattern of the set of sensing reference signal patterns with a first signal, and a second multiplexing type is defined for multiplexing a second sensing reference signal pattern of the set of sensing reference signal patterns with a second signal.

In various embodiments, a first multiplexing type is defined for multiplexing part of a sensing reference signal pattern of the set of sensing reference signal patterns with a second signal, and a second multiplexing type is defined for multiplexing another part of the sensing reference signal pattern with a second signal.

In one embodiment, a time domain multiplexing configuration for the set of sensing reference signal patterns comprises: multiple time domain patterns; a time domain pattern and a parameter set defining other sensing reference signal patterns relatively to a first sensing reference signal pattern; an index, a parameter set, or a combination thereof defining the set of sensing reference signal patterns with a time domain separation pattern from a codebook; or a combination thereof.

In certain embodiments, a frequency domain multiplexing configuration for the set of sensing reference signal patterns comprises: multiple frequency domain patterns; a frequency domain pattern and a parameter set defining other sensing reference signal patterns relatively to a first sensing reference signal pattern; an index, a parameter set, or a combination thereof defining the set of sensing reference signal patterns with a frequency domain separation pattern from a codebook; or a combination thereof.

In some embodiments, a joint time domain and frequency domain multiplexing configuration for the set of sensing reference signal patterns comprises: multiple joint time domain and frequency domain patterns; a joint time domain and frequency domain pattern and a parameter set defining other sensing reference signal patterns relatively to a first sensing reference signal pattern; an index, a parameter set, or a combination thereof defining the set of sensing reference signal patterns with joint time and frequency domain separation from a codebook; or a combination thereof.

In various embodiments, beam defining parameters corresponding to a sensing reference signal pattern of the set of sensing reference signal patterns comprises: a quasi-co-location type-D indication to a previously used reference signal, a data channel, a control channel, or some combination thereof; an index from a codebook defining linear or non-linear spatial filters; absolute angular information defining a beam direction with respect to a local coordinate system of the first device or a coordinate system known by the first device; relative angular information defining the beam direction in relation to a previously defined beam; spatial filter transformation in relation to the previously defined beam; usage of an indicated beam; or a combination thereof.

In one embodiment, a multiplexing configuration for the set of sensing reference signal patterns comprises: multiple sets of quasi-co-location type-D indications to other physical signals, reference signal patterns, or a combination thereof;

a set of parameters defining spatial filters associated with the set of sensing reference signal patterns; a set of angular information indicating a set of beam directions associated with the set of sensing reference signal patterns; a set of parameters relatively defining spatial beams jointly for the set of sensing reference signal patterns; or some combination thereof.

In certain embodiments, an indicated beam pattern comprises: a beam pattern for reception of multiplexed set of sensing reference signal patterns; a beam pattern for transmission of the multiplexed set of sensing reference signal patterns; a beam pattern for joint transmission and reception of the multiplexed set of sensing reference signal patterns; or some combination thereof.

In some embodiments, a multiplexing configuration for multiple sensing reference signals comprises: a joint definition of a set of code block group patterns along a time domain, a frequency domain, or the time domain and the frequency domain; a joint indication of a set of orthogonal sequences within each code block group assigned to each sensing reference signal pattern of the set of sensing reference signal patterns; a joint indication of sequences generating different base sequences for each sensing reference signal of the set of sensing reference signal patterns; or some combination thereof.

In various embodiments, a multiplexing configuration for multiple sensing reference signal patterns comprises: a joint definition of a set of harmonic multiplications along a time domain assigned to different sensing reference signal sequences; a joint definition of a set of harmonic multiplications along a frequency domain assigned to different sensing reference signal sequences; a joint definition of a set of harmonic multiplications jointly along the time domain and the frequency domain assigned to different sensing reference signal sequences; a joint definition of a set of linear time filters, frequency filters, or a combination thereof applied to different sensing reference signal sequence values; or some combination thereof.

In one embodiment: the receiver receives a configuration from the second device defining a size of a discrete Fourier transform spreading stage applied on a sensing reference signal after a serial-to-parallel conversion of a sensing reference signal sequence value; and the processor applies the discrete Fourier transform spreading stage on the sensing reference signal after the serial-to-parallel conversion of the sensing reference signal sequence value according to the received configuration.

In certain embodiments, a multiplexing configuration is applied between a first sensing reference signal pattern and: a second sensing reference signal pattern; a non-sensing reference signal; a physical data channel; a control channel; or some combination thereof prior to a discrete Fourier transform spreading stage applied to a multiplexed signal.

In some embodiments, a multiplexing configuration is applied between at least two signals after a discrete Fourier transform spreading stage.

In various embodiments: a first multiplexing configuration is applied between a first sensing reference signal and: a second sensing reference signal; a non-sensing reference signal; a data channel; a control channel; or some combination thereof prior to a discrete Fourier transform spreading stage being applied to a multiplexed signal via the first multiplexing configuration; and a second multiplexing configuration is applied between at least two signals after the discrete Fourier transform spreading stage.

In one embodiment, a sensing reference signal joint multiplexing and discrete Fourier transform spreading configuration is defined via a filtering configuration prior to a discrete Fourier transform spreading stage, and the filtering configuration comprises: a dimension of a pre-discrete Fourier transform filter; a signal input combination; a frequency domain placement of the pre-discrete Fourier transform filter with respect to an input signal; a frequency domain placement of the pre-discrete Fourier transform filter with respect to an output signal; a type of multiplexing for a filter output; a filter type; a parameter set defining the filter type, a dimension, a position, or a combination thereof via a pre-defined codebook; or some combination thereof.

In certain embodiments: the receiver receives a configuration defining a pre-inverse fast Fourier transfer filtering stage comprising: a filter dimension; a filter type; and a parameter set defining the filter type, the filter dimension, a position via a pre-defined codebook; and the processor applies the pre-inverse fast Fourier transfer filtering stage.

In some embodiments: sensing reference signal parameters are configured with periodic resources via radio resource control signaling; the sensing reference signal parameters are configured semi-statically via radio resource control signaling with a semi-persistent sensing reference signal resource pattern and dynamically activated via physical downlink control channel downlink control information, via a physical downlink shared channel, via a medium access control control element, or some combination thereof; the sensing reference signal parameters are configured dynamically and periodically via physical downlink control channel downlink control information or a physical downlink shared channel; the sensing reference signal parameters are configured via multicast or a broadcast-type signaling; or some combination thereof.

In various embodiments, a first part of the sensing reference signal parameters are configured semi-statically via radio resource control signaling, and a second part of the sensing reference signal parameters are configured dynamically via physical downlink control channel downlink control information or via physical downlink shared channel signaling.

In one embodiment, a dynamically or semi-statically configured sensing reference signal parameters or a subset thereof are modified via a dynamically received configuration via physical downlink control channel downlink control information or via physical downlink shared channel, and the dynamic configuration comprises: a set of parameters to replace the sensing reference signal parameters; a set of parameters to relatively define the set of sensing reference signal parameters or a subset thereof with a combination type; a resource pattern in a time domain, in a frequency domain, or in the time domain and the frequency domain, wherein the resource pattern is combined with a current sensing reference signal pattern to construct a new pattern together with a combination type; or some combination thereof.

In certain embodiments, sensing reference signal multiplexing parameters are defined: semi-statically via radio resource control signaling; dynamically via physical downlink control channel downlink control information or a physical downlink shared channel message; dynamically via the physical downlink control channel downlink control information, with a cyclic redundancy check scrambled with group common downlink control information, or via broadcast-type signaling; dynamically via a subset of sensing reference signal resource elements; or some combination thereof.

In some embodiments, a first subset of the sensing reference signal multiplexing parameters are defined via a first signaling type and a second subset of the sensing reference signal multiplexing parameters are defined via a second signaling type.

In various embodiments, the apparatus further comprises a set of parameters defining a modification of a first sensing reference signal multiplexing configuration, wherein the first configuration is defined semi-statically or dynamically, and an additional parameter set is defined: dynamically via physical downlink control channel downlink control information or a physical downlink shared channel message; dynamically via physical downlink control channel downlink control information or with a cyclic redundancy check scrambled with group common downlink control information; or some combination thereof.

In one embodiment, the apparatus further comprises information indicating an identifier number: for a sensing reference signal pattern; for a group of sensing reference signal patterns; for a reference signal resource pattern in a time domain; for a reference signal resource pattern in a frequency domain; for a reference signal resource pattern jointly in the time domain and the frequency domain; for a reference signal beam pattern; for a sensing reference signal sequence; for a sensing reference signal sequence mapping strategy to a physical resource; or some combinations thereof.

In certain embodiments, a joint multiplexing configuration for multiple sensing reference signals comprises: a joint identifier number; a joint measurement type; a joint reporting criterion; a joint reporting type; joint time reporting resources; joint frequency reporting resources; joint beam reporting resources; or some combination thereof.

In one embodiment, a method of a second device comprises: transmitting a first configuration to a first device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; transmitting a second configuration to the first device, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; and transmitting a third configuration to the first device, wherein the third configuration indicates to perform measurements on received sensing reference signals and feedback a measurement report.

In certain embodiments, the method further comprises transmitting a configuration to the first device defining a size of a discrete Fourier transform spreading stage applied on a sensing reference signal after a serial-to-parallel conversion of a sensing reference signal sequence value.

In some embodiments, the method further comprises transmitting a configuration defining a pre-inverse fast Fourier transfer filtering stage comprising: a filter dimension; a filter type; and a parameter set defining the filter type, the filter dimension, a position via a pre-defined codebook.

In one embodiment, an apparatus comprises a second device. The apparatus further comprises: a transmitter that: transmits a first configuration to a first device, wherein the first configuration indicates a set of sensing reference signal patterns corresponding to at least one waveform type, each sensing reference signal pattern of the set of sensing reference signal patterns defines a time location and a frequency location within at least one physical resource block, at least one antenna port identifier for indicated resources, at least one beam direction for the at least one antenna port identifier, a sensing reference signal pattern identifier, or a combination thereof; transmits a second configuration to the first device, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; and transmits a third configuration to the first device, wherein the third configuration indicates to perform measurements on received sensing reference signals and feedback a measurement report.

In certain embodiments, the transmitter transmits a configuration to the first device defining a size of a discrete Fourier transform spreading stage applied on a sensing reference signal after a serial-to-parallel conversion of a sensing reference signal sequence value.

In some embodiments, the transmitter transmits a configuration defining a pre-inverse fast Fourier transfer filtering stage comprising: a filter dimension; a filter type; and a parameter set defining the filter type, the filter dimension, a position via a pre-defined codebook.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:
   receiving a first configuration from a base station, wherein the first configuration indicates a set of sensing reference signal patterns, each sensing reference signal pattern of the set of sensing reference signal patterns defines a time location and a frequency location within at least one physical resource block (PRB), at least one antenna port identifier for indicated resources, at least one beam direction for the at least one antenna port identifier, and a sensing reference signal pattern identifier;
   receiving a second configuration from the base station, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; and
   in response to receiving the second configuration:
      multiplexing the set of sensing reference signal patterns with other physical channels and signals;
      in response to being scheduled, transmitting the multiplexed set of sensing reference signal patterns;
      in response to being scheduled, receiving the multiplexed set of sensing reference signal patterns; and
      receiving a third configuration from the base station, wherein the third configuration indicates to perform measurements on received sensing reference signals and feedback a measurement report.

2. The method of claim 1, wherein a multiplexing configuration for a sensing reference signal or a set of defined sensing reference signals comprises:
- a multiplexing pattern in a time domain;
- a multiplexing pattern in a frequency domain;
- a multiplexing pattern in a code domain, a sequence domain, or both;
- or a combination thereof.

3. The method of claim 2, wherein a first multiplexing type is defined for multiplexing a first sensing reference signal pattern of the set of sensing reference signal patterns with a first signal, and a second multiplexing type is defined for multiplexing a second sensing reference signal pattern of the set of sensing reference signal patterns with a second signal.

4. The method of claim 2, wherein a first multiplexing type is defined for multiplexing part of a sensing reference signal pattern of the set of sensing reference signal patterns with a second signal, and a second multiplexing type is defined for multiplexing another part of the sensing reference signal pattern with a second signal.

5. The method of claim 2, wherein a time domain multiplexing configuration for the set of sensing reference signal patterns comprises:
- multiple time domain patterns;
- a time domain pattern and a parameter set defining other sensing reference signal patterns relatively to a first sensing reference signal pattern;
- an index, a parameter set, or a combination thereof defining the set of sensing reference signal patterns with a time domain separation pattern from a codebook;
- or a combination thereof.

6. The method of claim 2, wherein a joint time domain and frequency domain multiplexing configuration for the set of sensing reference signal patterns comprises:
- multiple joint time domain and frequency domain patterns;
- a joint time domain and frequency domain pattern and a parameter set defining other sensing reference signal patterns relatively to a first sensing reference signal pattern;
- an index, a parameter set, or a combination thereof defining the set of sensing reference signal patterns with joint time and frequency domain separation from a codebook;
- or a combination thereof.

7. The method of claim 1, wherein beam defining parameters corresponding to a sensing reference signal pattern of the set of sensing reference signal patterns comprises:
- a quasi-co-location type-D indication to a previously used reference signal, a data channel, a control channel, or some combination thereof;
- an index from a codebook defining linear or non-linear spatial filters;
- absolute angular information defining a beam direction with respect to a local coordinate system of the UE or a coordinate system known by the UE;
- relative angular information defining the beam direction in relation to a previously defined beam;
- spatial filter transformation in relation to the previously defined beam;
- usage of an indicated beam;
- or a combination thereof.

8. The method of claim 1, wherein a multiplexing configuration for the set of sensing reference signal patterns comprises:
- multiple sets of quasi-co-location type-D indications to other physical signals, reference signal patterns, or a combination thereof;
- a set of parameters defining spatial filters associated with the set of sensing reference signal patterns;
- a set of angular information indicating a set of beam directions associated with the set of sensing reference signal patterns;
- a set of parameters relatively defining spatial beams jointly for the set of sensing reference signal patterns;
- or a combination thereof.

9. The method of claim 8, wherein an indicated beam pattern comprises:
- a beam pattern for reception of multiplexed set of sensing reference signal patterns;
- a beam pattern for transmission of the multiplexed set of sensing reference signal patterns;
- a beam pattern for joint transmission and reception of the multiplexed set of sensing reference signal patterns;
- or a combination thereof.

10. The method of claim 1, wherein a multiplexing configuration for multiple sensing reference signals comprises:
- a joint definition of a set of code block group patterns along a time domain, a frequency domain, or the time domain and the frequency domain;
- a joint indication of a set of orthogonal sequences within each code block group assigned to each sensing reference signal pattern of the set of sensing reference signal patterns;
- a joint indication of sequences generating different base sequences for each sensing reference signal of the set of sensing reference signal patterns;
- or a combination thereof.

11. The method of claim 1, further comprising:
- receiving a configuration from the base station defining a size of a discrete Fourier transform spreading stage applied on a sensing reference signal after a serial-to-parallel conversion of a sensing reference signal sequence value; and
- applying the discrete Fourier transform spreading stage on the sensing reference signal after the serial-to-parallel conversion of the sensing reference signal sequence value according to the received configuration.

12. The method of claim 11, wherein a multiplexing configuration is applied between at least two signals after a discrete Fourier transform spreading stage.

13. The method of claim 1, wherein:
- sensing reference signal parameters are configured with periodic resources via radio resource control signaling;
- the sensing reference signal parameters are configured semi-statically via radio resource control signaling with a semi-persistent sensing reference signal resource pattern and dynamically activated via physical downlink control channel downlink control information, via a physical downlink shared channel, via a medium access control control element, or some combination thereof;
- the sensing reference signal parameters are configured dynamically and periodically via physical downlink control channel downlink control information or a physical downlink shared channel;
- the sensing reference signal parameters are configured via multicast or a broadcast-type signaling;
- or a combination thereof.

14. The method of claim 13, wherein a first part of the sensing reference signal parameters are configured semi-statically via radio resource control signaling, and a second part of the sensing reference signal parameters are configured dynamically via physical downlink control channel downlink control information or via physical downlink shared channel signaling.

15. The method of claim 13, wherein a dynamically or semi-statically configured sensing reference signal parameters or a subset thereof are modified via a dynamically received configuration via physical downlink control channel downlink control information or via physical downlink shared channel, and the dynamic configuration comprises:
   a set of parameters to replace the sensing reference signal parameters;
   a set of parameters to relatively define the set of sensing reference signal parameters or a subset thereof with a combination type;
   a resource pattern in a time domain, in a frequency domain, or in the time domain and the frequency domain, wherein the resource pattern is combined with a current sensing reference signal pattern to construct a new pattern together with a combination type;
   or a combination thereof.

16. The method of claim 1, wherein sensing reference signal multiplexing parameters are defined:
   semi-statically via radio resource control signaling;
   dynamically via physical downlink control channel downlink control information or a physical downlink shared channel message;
   dynamically via the physical downlink control channel downlink control information, with a cyclic redundancy check scrambled with group common downlink control information, or via broadcast-type signaling;
   dynamically via a subset of sensing reference signal resource elements;
   or a combination thereof.

17. The method of claim 16, wherein a first subset of the sensing reference signal multiplexing parameters are defined via a first signaling type and a second subset of the sensing reference signal multiplexing parameters are defined via a second signaling type.

18. The method of claim 1, wherein a joint multiplexing configuration for multiple sensing reference signals comprises:
   a joint identifier number;
   a joint measurement type;
   a joint reporting criterion;
   a joint reporting type;
   joint time reporting resources;
   joint frequency reporting resources;
   joint beam reporting resources;
   or a combination thereof.

19. A user equipment (UE), comprising:
   at least one memory; and
   at least one processor coupled with the at least one memory and configured to cause the UE to:
      receive a first configuration from a base station, wherein the first configuration indicates a set of sensing reference signal patterns, each sensing reference signal pattern of the set of sensing reference signal patterns defines a time location and a frequency location within at least one physical resource block (PRB), at least one antenna port identifier for indicated resources, at least one beam direction for the at least one antenna port identifier, and a sensing reference signal pattern identifier;
      receive a second configuration from the base station, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; and
      in response to receiving the second configuration:
      multiplex the set of sensing reference signal patterns with other physical channels and signals;
      in response to being scheduled, transmit the multiplexed set of sensing reference signal patterns; and
      in response to being scheduled, receive the multiplexed set of sensing reference signal patterns; and
      receive a third configuration from the base station, wherein the third configuration indicates to perform measurements on received sensing reference signals and feedback a measurement report.

20. A base station, comprising:
   at least one memory; and
   at least one processor coupled with the at least one memory and configured to cause the base station to:
      transmit a first configuration to a user equipment (UE), wherein the first configuration indicates a set of sensing reference signal patterns, each sensing reference signal pattern of the set of sensing reference signal patterns defines a time location and a frequency location within at least one physical resource block (PRB), at least one antenna port identifier for indicated resources, at least one beam direction for the at least one antenna port identifier, and a sensing reference signal pattern identifier;
      transmit a second configuration to the UE, wherein the second configuration indicates one sensing reference signal pattern identifier, a group of sensing reference signal pattern identifiers, or a combination thereof from at least one sensing reference signal pattern identifier in the first configuration for multiplexing with physical channels and other reference signals; and
      transmit a third configuration to the UE, wherein the third configuration indicates to perform measurements on received sensing reference signals and feedback a measurement report.

* * * * *